United States Patent
Stibich et al.

(10) Patent No.: US 10,490,048 B2
(45) Date of Patent: Nov. 26, 2019

(54) SMOKE DETECTOR SHIELDS AND RELATED METHODS

(71) Applicant: Xenex Disinfection Services, LLC., San Antonio, TX (US)

(72) Inventors: Mark A. Stibich, Santa Fe, NM (US); Sarah E. Simmons, San Antonio, TX (US); Edward C. Guerrero, Jr., San Antonio, TX (US); Paul P. Froutan, Katy, TX (US); Nicholas Whitelonis, San Antonio, TX (US); Joseph Taber, San Antonio, TX (US)

(73) Assignee: Xenex Disinfection Services Inc., San Antonio, TX (US)

( * ) Notice: Subject to any disclaimer, the term of this patent is extended or adjusted under 35 U.S.C. 154(b) by 0 days.

(21) Appl. No.: 16/227,916

(22) Filed: Dec. 20, 2018

(65) Prior Publication Data

US 2019/0122515 A1  Apr. 25, 2019

Related U.S. Application Data

(60) Division of application No. 16/037,500, filed on Jul. 17, 2018, now Pat. No. 10,217,341, which is a
(Continued)

(51) Int. Cl.
*G08B 17/107* (2006.01)
*G08B 17/10* (2006.01)
(Continued)

(52) U.S. Cl.
CPC .......... *G08B 17/107* (2013.01); *G08B 17/10* (2013.01); *F16M 11/245* (2013.01); *G08B 29/18* (2013.01)

(58) Field of Classification Search
CPC ......... G08B 17/107–113; G08B 29/145; A24F 19/0042; H01J 61/34
See application file for complete search history.

(56) References Cited

U.S. PATENT DOCUMENTS

| 4,043,776 A | 8/1977 | Orel |
| 4,168,438 A | 9/1979 | Morisue |

(Continued)

FOREIGN PATENT DOCUMENTS

| DE | 102011016275 | 7/2012 |
| DE | 202013003464 | 6/2013 |

(Continued)

OTHER PUBLICATIONS

Xenex, Notification of Transmittal of the International Preliminary Report on Patentability, PCT/US2017/013961, dated Apr. 18, 2018, 21 pgs.

(Continued)

*Primary Examiner* — Orlando Bousono
(74) *Attorney, Agent, or Firm* — Egan Peterman Enders Huston

(57) ABSTRACT

Smoke detector shields for blocking or minimizing the transmission of light therethrough and methods for use are provided. According to one embodiment, a method for shielding a smoked detector includes shielding at least a portion of a smoke detector operationally arranged within a room, and subsequently activating a light emission device arranged within the room, while shielding the smoke detector. In order to exclude light emission devices, which are commonly used within a room for lighting and/or communication purposes, the light emission device set forth in the method is configured for generating infrared light at a radiant intensity greater than approximately 1 W/sr, and/or ultraviolet light at a radiant intensity greater than approximately 1 W/sr, and/or visible light at a luminous flux greater (Continued)

than approximately 3000 lumens. Embodiments of smoke detector shields that prevent such light from penetrating the housing of a shielded smoke detector are provided herein.

17 Claims, 11 Drawing Sheets

Related U.S. Application Data continuation of application No. PCT/US2017/013961, filed on Jan. 18, 2017.

(60) Provisional application No. 62/280,001, filed on Jan. 18, 2016.

(51) Int. Cl.
*F16M 11/24* (2006.01)
*G08B 29/18* (2006.01)

(56) References Cited

U.S. PATENT DOCUMENTS

| | | | |
|---|---|---|---|
| 4,177,045 | A | 12/1979 | Orel |
| 4,333,195 | A | 6/1982 | Lichti |
| 4,462,244 | A | 7/1984 | Lee |
| 4,803,335 | A | 2/1989 | Steen et al. |
| 4,849,862 | A | 7/1989 | Diskin et al. |
| 5,234,428 | A | 8/1993 | Kaufman |
| 5,296,779 | A | 3/1994 | Muzeroll |
| 5,340,346 | A | 8/1994 | Muzeroll |
| 5,363,976 | A | 11/1994 | Kapka |
| 5,372,477 | A | 12/1994 | Cole |
| 5,440,145 | A | 8/1995 | Cole |
| 5,670,946 | A | 9/1997 | Ellwood et al. |
| 6,518,574 | B1 | 2/2003 | Castleman |
| 9,696,026 | B1 | 7/2017 | Hardgrave |
| 10,217,341 | B2 | 2/2019 | Stibich et al. |
| 2001/0037804 | A1 | 11/2001 | Waters et al. |
| 2001/0038338 | A1 | 11/2001 | Kadwell et al. |
| 2004/0217608 | A1 | 11/2004 | Kelly |
| 2005/0134468 | A1 | 6/2005 | Thomas et al. |
| 2005/0202395 | A1 | 9/2005 | Edrich et al. |
| 2006/0261967 | A1 | 11/2006 | Marman et al. |
| 2008/0012715 | A1 | 1/2008 | Montgomery |
| 2008/0087492 | A1 | 4/2008 | Cox et al. |
| 2010/0073926 | A1 | 3/2010 | Kudoh et al. |
| 2017/0116826 | A1* | 4/2017 | Spina .................. G08B 17/10 |

FOREIGN PATENT DOCUMENTS

| | | |
|---|---|---|
| DE | 202013005999 | 9/2013 |
| GB | 2464269 | 4/2010 |
| JP | 5962997 | 4/1984 |
| JP | 2000268268 | 9/2000 |
| JP | 2012128777 | 7/2012 |
| WO | 0159737 | 8/2001 |

OTHER PUBLICATIONS

Xenex, Written Opinion of the International Preliminary Examining Authority, PCT/US2017/013961, dated Jan. 26, 2018, 8 pgs.
Xenex, Notification of Transmittal of the International Search Report and the Written Opinion of the International Searching Authority or the Declaration, PCT/US2017/013961, dated Sep. 28, 2017, 21 pgs.
Translation of Notification of Provisional Refusal, Korean Patent Application No. 10-2018-7023896, dated Nov. 15, 2018, 5 pgs.
Office Action, EP Patent Application No. 17704585.3, dated Nov. 15, 2018, 5 pgs.
Translation of Notice of the Reason for Refusal, Japanese Patent Application No. 2018-544209 dated Dec. 18, 2018, 5 pages.
US Patent and Trademark Office, Notice of Allowability for U.S. Appl. No. 16/037,500 dated Sep. 27, 2018, 14 pages.
US Patent and Trademark Office, Supplemental Notice of Allowance for U.S. Appl. No. 16/037,500 dated Jan. 18, 2019, 2 pages.

* cited by examiner

SMOKE DETECTOR SHIELDS AND RELATED METHODS

PRIORITY CLAIM

This application is a divisional of pending U.S. patent application Ser. No. 16/037,500, filed Jul. 17, 2018, which is a continuation of pending International Patent Application No. PCT/US2017/013961 filed Jan. 18, 2017, which designates the United States and claims priority to U.S. Provisional Patent Application No. 62/280,001, filed Jan. 18, 2016.

BACKGROUND OF THE INVENTION

1. Field of the Invention

This invention generally relates to shields for smoke detectors.

2. Description of the Related Art

The following descriptions and examples are not admitted to be prior art by virtue of their inclusion within this section.

Photoelectric smoke detectors use a light source and a photoelectric receiver to detect whether or not smoke is present in its ambient. Smoke is determined to be present when a change in the amount of light received at the photoelectric receiver exceeds a pre-determined value. Upon the smoke detector determining smoke is present, a fire alarm is tripped. Some smoke detectors, sometimes referred to as spot type smoke detectors, have its light source and photoelectric receiver arranged in a chamber within the smoke detector for a confined location at which to detect smoke. Other smoke detectors project a beam of light exterior to the smoke detector to detect smoke. The latter is commonly used in large wide open spaces, such as auditoriums. Spot type smoke detectors, on the other hand, are commonly used in rooms of relatively smaller size, such as rooms typically found in a house, office building or hospital. In either type, the light source is generally an infrared light source, an ultraviolet light source or a visible light source.

In some cases, a photoelectric receiver of a smoke detector may not be shielded from ambient light in the room in which the smoke detector is arranged and, thus, infrared light, ultraviolet light, relatively large changes of visible light, or particularly high intensities of visible light from external sources in the room may cause the smoke detector to trigger a false fire alarm. Examples of devices and systems which may constitute such external sources of infrared light, ultraviolet light and/or visible light may include but are not limited to germicidal light disinfection systems, operating room lights, phototherapy systems, UV light curing systems and remote controls for electronic devices. Removing or de-energizing smoke detectors is generally against fire codes and, thus, neither is an option for mitigating false fire alarms that may occur during the operation of external sources of infrared light, ultraviolet light and/or visible light in a room.

Accordingly, it would be beneficial to develop a device that shields a photoelectric receiver of a spot type smoke detector from light generated in the ambient of a room in which the smoke detector is arranged.

SUMMARY OF THE INVENTION

The following description of various embodiments of smoke detector shields and methods of use is not to be construed in any way as limiting the subject matter of the appended claims.

Smoke detector shields, which are configured to block or minimize the transmission of light there through, and methods for use are provided herein. According to one embodiment, a smoke detector shield may include a shroud configured for surrounding at least a majority portion of a smoke detector. The shroud may comprise one or more materials that block that transmission of infrared light, ultraviolet light and/or visible light. In one embodiment, the material used to form the shroud may be specifically configured for blocking transmission of infrared light.

In one embodiment, the shroud of the smoke detector shield may generally include a first end, a second end opposing the first end, one or more sidewalls extending between the first and second ends, and a seal. The first end may have an opening, which is dimensionally configured to receive a smoke detector mounted on a surface (e.g., a ceiling or wall of a room). In some cases, the opening in the first end of the shroud may range between about 4 inches and about 12 inches in diameter. The second end of the shroud may have an opening, which is dimensionally configured to expose one or more smoke inlets of the received smoke detector. In some cases, the opening in the second end of the shroud ranges between about 2 inches and about 10 inches in diameter. The one or more sidewalls of the shroud may be collectively configured to surround a portion of the received smoke detector without covering the exposed smoke inlets. In some cases, a height of the one or more sidewalls may range between about 1 inch and about 6 inches.

In some cases, the first and second ends of the shroud may both comprise a substantially rigid material. In other cases, the first end of the shroud may comprise a substantially pliant material, and the second end of the shroud may comprise a substantially rigid material. Examples of substantially rigid materials include, but are not limited to, a modified polyphenyene ether/olefin resin blend (e.g., a Noryl™ resin), poly(methyl methacrylate) (aka, Plexiglas™), polycarbonate, wood, and various metals or metalized materials (e.g., gold, aluminum, etc.). Examples of substantially pliant materials include, but are not limited to, biaxially-oriented polyethylene terephthalate (aka, Mylar™), polytetrafluoroethylene (PTFE) (aka, Teflon™), and silicone. In some cases, one or more of the materials listed above as pliant may be made rigid (and vice versa), depending on blend, composition, thickness, etc. of the material. In some cases, a substantially pliant material may be infused or coated onto a substantially rigid base to render the combination substantially rigid.

Regardless of whether the first and second ends comprise the same material or a different material, or a substantially rigid material or a substantially pliant material, the shroud preferably comprises a material that is configured to block the transmission of infrared light, and/or ultraviolet light and/or visible light. Examples of materials configured to block infrared light include, but are not limited to, a modified polyphenyene ether/olefin resin blend (e.g., a Noryl™ resin), poly(methyl methacrylate) (aka, Plexiglas™) having a thickness greater than about 0.118 inch, biaxially-oriented polyethylene terephthalate (aka, Mylar™), and various metals or metalized materials (e.g., gold, aluminum, etc.). Examples of materials configured to block ultraviolet light include, but are not limited to, poly(methyl methacrylate) (aka, Plexiglas™), polytetra-fluoroethylene (PTFE) (aka, Teflon™), biaxially-oriented polyethylene terephthalate (aka, Mylar™), polycarbonate, wood, silicone, and various metals or metalized materials. Some of the materials listed above may also be configured to block the transmission of visible light.

In some cases, the shroud may comprise a seal, which is disposed at least along a peripheral edge of the opening in the second end of the shroud. The seal may dimensionally configured to conform to an exterior surface of the smoke detector. In some cases, the seal may be a gasket. In other cases, the seal may comprise an elastic material or an elastic band. In any case, the seal may be disposed along the peripheral edge of the opening in the second end of the shroud to provide a light tight and/or air tight seal at the exterior surface of the smoke detector.

In some embodiments, the smoke detector shield may further include two or more suspension members coupled to and extending below the shroud, and a component coupled to the suspension members, such that a gap exists between the shroud and the component. In some embodiments, a lower surface of the component may include a connector for coupling to a pole. In some embodiments, the smoke detector shield may further include one or more quick release devices for decoupling the pole from the connector.

According to another embodiment, a device for shielding a smoke detector is provided herein with a shroud, which is configured for surrounding at least a majority portion of a smoke detector, and a pole having a first end coupled to the shroud, and a second end opposing the first end. In some cases, the pole may comprise a length, or may be configured to extend to a length, of at least approximately 3.0 feet. In other cases, the pole may comprise a length, or may be configured to extend to a length, of at least approximately 5.0 feet. In some cases, the pole may be a fixed length pole. In other cases, the pole may be a telescoping pole. In some cases, one or more quick release devices may be included for detaching the pole from the shroud and/or for disassembling the pole into two or more sections.

In some embodiments, the device may include a support base, which is coupled near the second end of the pole for supporting the device on a substantially horizontal surface. In some cases, the support base may be a collapsible tripod, although the support base is not so limited. In some cases, the support base, shroud, and pole may be configurable such that the device is able to attain a height of at least approximately 7 feet, at least approximately 9 feet, or at least approximately 12 feet. Other heights may also be attainable by the device. In some cases, the support base may be omitted, and the second end of the pole may be configured for supporting the device on a substantially horizontal surface.

In some embodiments, the shroud may be configured to encapsulate an entirety of the smoke detector when the smoke detector is mounted to a surface (e.g., a ceiling or wall of a room). In other embodiments, the shroud may be configured to surround at least a majority portion of the smoke detector, while leaving one or more smoke inlets of the smoke detector uncovered by the shroud. In some embodiments, the shroud may comprise an upper surface, which is configured for attachment to a surface upon which the smoke detector is mounted. In other embodiments, the shroud may comprise an upper surface, which is configured for attachment to the smoke detector.

Exemplary methods for shielding a smoke detector are also provided herein. Such methods may be performed using any of the smoke detector shield embodiments described herein. In general, such methods may include shielding at least a portion of a smoke detector that is operationally arranged within a room, and activating a light emission device arranged within the room while shielding the at least a portion of the smoke detector. In some cases, the method may include deactivating the light emission device, and subsequently unshielding the smoke detector. In other cases, the smoke detector may remain shielded after the light emission device has been deactivated.

In order to exclude light emission devices, which are commonly used within a room for lighting and/or communication purposes, the light emission device may be configured for generating infrared light at a radiant intensity greater than approximately 1 W/sr, and/or ultraviolet light at a radiant intensity greater than approximately 1 W/sr, and/or visible light at a luminous flux greater than approximately 3000 lumens. In one example, the light emission device may be a germicidal light disinfection apparatus. In such an example, the step of activating the light emission device may include remotely activating the light emission device from outside of the room. In some cases, the room may be evacuated subsequent to positioning the smoke detector shield around the smoke detector and prior to activating the light emission device, when the light emission device is a germicidal light disinfection apparatus.

BRIEF DESCRIPTION OF THE DRAWINGS

Other objects and advantages of the invention will become apparent upon reading the following detailed description and upon reference to the accompanying drawings in which.

Figure 1:
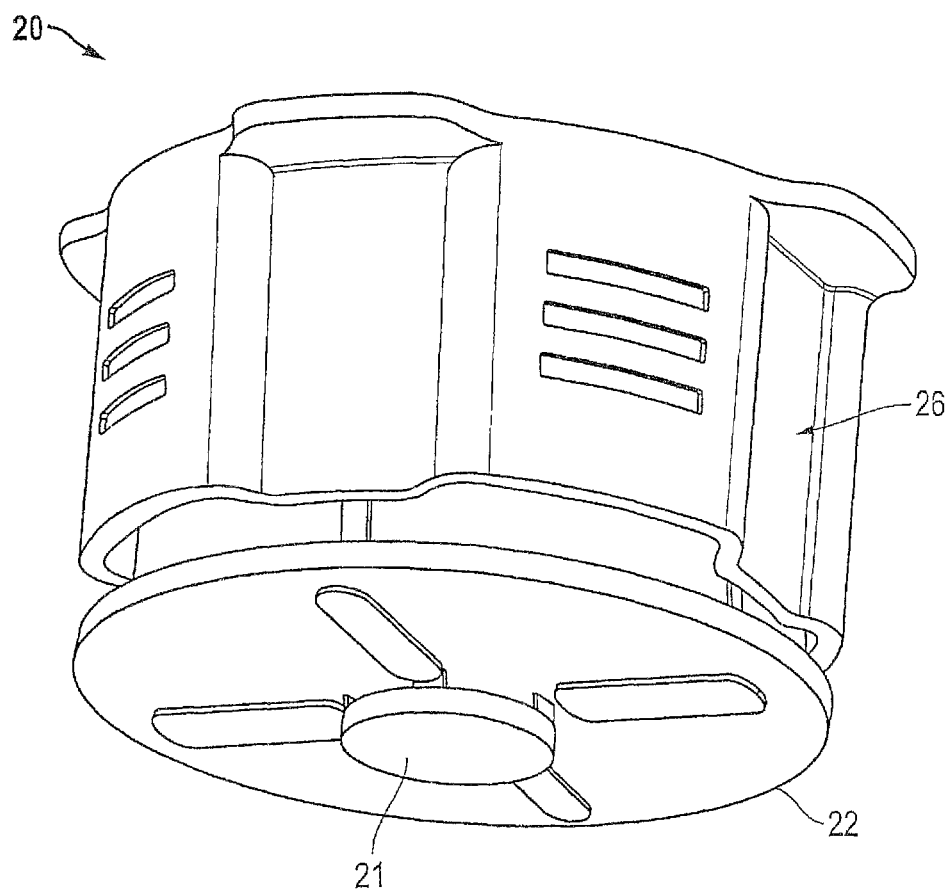
FIG. 1 illustrates a perspective view of a first embodiment of a smoke detector shield including an a tortuous air path for smoke to enter the smoke detector shield.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Smoke detector shields and methods are provided herein to mitigate false tripping of smoke detectors, which are generally associated with smoke and/or fire alarms. As used herein, the term "smoke alarm" refers to a device or system having at least one smoke sensing device, at least one audible alarm and at least one power source (e.g., a battery or connection to mains power). Conversely, the term "smoke detector" as used herein refers only to the smoke sensing device. Unlike an alarm, a "smoke detector" does not contain an audible alarm or its own power source and, thus, must be coupled to another device or system comprising such in order to detect and alert the presence of smoke in its ambient environment.

Figure 12:
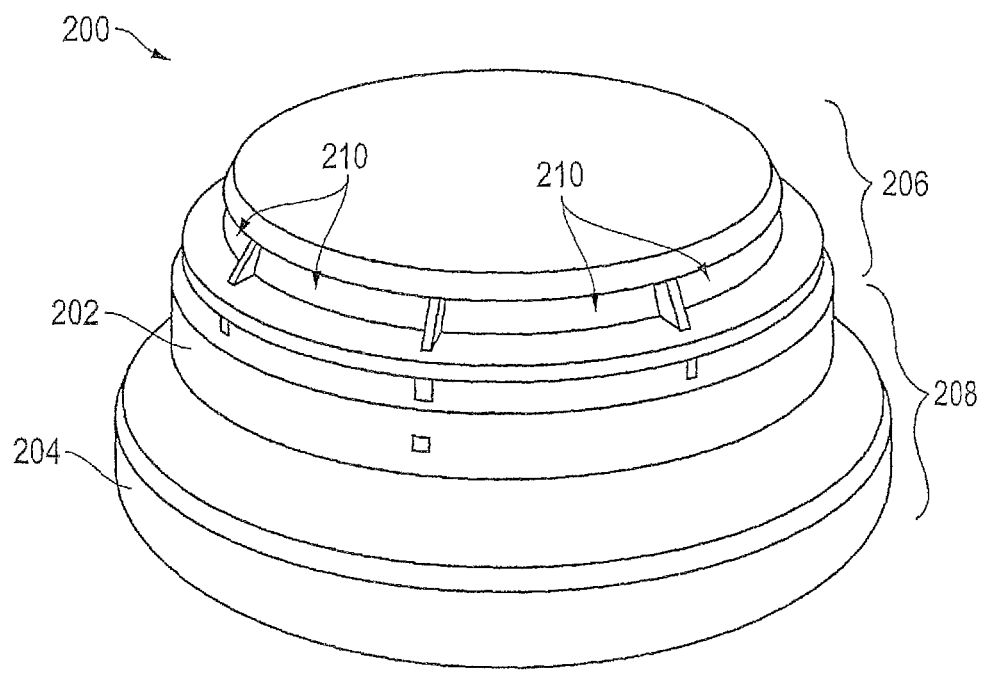
FIG. 12 illustrates a perspective view of an exemplary smoke alarm having a smoke detector coupled to a base.
Figure 13:
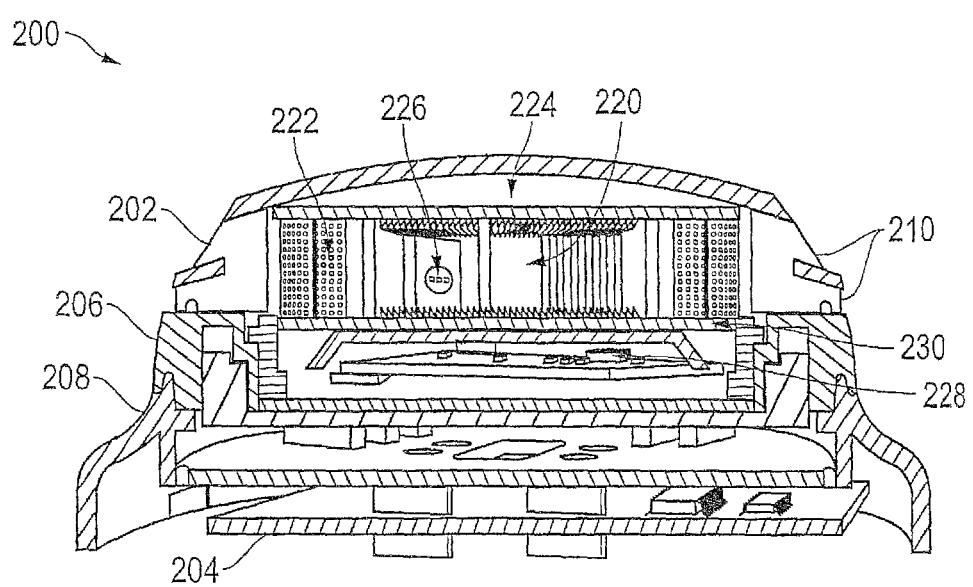
FIG. 13 is a cross-sectional view drawing of the smoke alarm depicted in FIG. 12.

In some cases, a smoke detector may be electrically coupled to a base, which includes an audible alarm and a power supply. In such cases, the combination of the smoke detector and the base may provide a single self-contained smoke alarm for detecting and alerting the presence of smoke. An example of a self-contained smoke alarm comprising both a smoke detector and a base is illustrated in FIGS. 12 and 13 and discussed in more detail below. In other cases, a smoke detector without a base may be coupled to an alarm system, such as but not limited to a fire control alarm panel, which may be common to a plurality of smoke detectors and/or include a variety of additional functions other than triggering an audible alarm (e.g., activating visual alarms, activating a sprinkler system and/or alerting a fire response team). In yet other cases, a smoke detector with a base (having an audible alarm and/or a power supply in the base) may be coupled to an alarm system, which is common to a plurality of smoke detectors and, thus, the device depicted in FIGS. 12 and 13 may also represent a smoke alarm integrated within a system connected to a plurality of smoke alarms.

As set forth in more detail below, the embodiments of smoke detector shields and methods described herein may mitigate false tripping of smoke detectors by shielding at least a portion of a smoke detector, or at least a portion of the smoke sensing device of a smoke alarm, from ambient light in a room in which the smoke detector/alarm is operationally arranged. As used herein, "operationally arranged" means the smoke detector is arranged within the room and connected to a power source (such as a battery or mains power) for detecting the presence of smoke.

There are many different types of smoke detectors, including those intended to detect heat, changes in ionization or changes in light. The latter type of smoke detector, referred to as a photoelectric smoke detector, generally includes a light source configured to emit light, a photoelectric receiver configured to generate a photocurrent upon detecting light, and circuitry configured to convert the photocurrent into a signal voltage. The light emitted and/or detected in a photoelectric smoke detector may include infrared light, ultraviolet light and/or visible light.

In some types of photoelectric smoke detectors, referred to as spot type photoelectric smoke detectors, the light source and the photoelectric receiver are confined within the smoke detector housing, so that light from the light source is projected within the housing and detected by the photoelectric receiver. In such a smoke detector, smoke particles present within the housing may be detected based on a light scattering principle or a light obstruction principle, depending on the relative arrangement of the light source and photoelectric receiver within the smoke detector housing.

According to one embodiment, the smoke detector shields and methods described herein may be specifically configured to mitigate false tripping of spot type photoelectric smoke detectors. More specifically, the smoke detector shields described herein may be configured to prevent photoelectric smoke detectors, particularly the photoelectric receivers provided within the housing of a photoelectric smoke detector, from receiving and detecting ambient light in a room.

As used herein, the term "ambient light" refers to light generated or transmitted into a room exterior to the smoke detector. Ambient light may be any type or spectrum of light, including but not limited to infrared light, ultraviolet light, and/or visible light. Ambient light may be generated by a natural source (such as the sun, for example) or by another source external to the smoke detector. Examples of devices and systems which may provide external sources of infrared light, ultraviolet light and/or visible light may include, but are not limited to, germicidal light disinfection systems, operating room lights, phototherapy systems, UV light curing systems and remote controls for electronic devices.

When a spot type photoelectric smoke detector is configured to operate in accordance with the light scattering principle, the light source and photoelectric receiver are typically mounted on a common surface within a smoke sensing chamber of the smoke detector. The light source is often positioned at an angle to a spectrally matched photoelectric receiver, and configured to project a beam of light into the smoke sensing chamber. Ideally, during a "no smoke" condition, only light reflected from the chamber walls may enter the photoelectric receiver and show up as a small photocurrent. As smoke particles enter the smoke sensing chamber and cross the projected light beam, however, more light particles reach the photoelectric receiver due to scattering. This results in a larger photocurrent, which is converted by the receiver circuitry into a signal voltage. The signal voltage may either be digitized and transmitted to a fire alarm system for further processing, or may be used to produce an alarm if the signal voltage crosses a threshold level.

When a spot type photoelectric smoke detector is configured to operate in accordance with the light obstruction principle, the light source is typically mounted within the smoke sensing chamber of the smoke detector, while the photoelectric receiver is mounted outside of the smoke sensing chamber. In some cases, the photoelectric receiver may be mounted on a surface opposing the surface on which the light source is mounted, and may be positioned within the path of the light beam projected by the light source. As smoke particles enter the smoke sensing chamber and cross the projected light beam, light is scattered and redirected away from the photoelectric receiver, resulting in decreased photocurrent. The photocurrent generated by the photoelectric receiver is converted by the receiver circuitry into a signal voltage, which may be digitized and transmitted to a fire alarm system for further processing, or may be used to signal an alarm when the signal voltage crosses a threshold level.

Turning now to the drawings, FIG. 12 illustrates a perspective view of an exemplary smoke alarm 200 including a spot type photoelectric smoke detector 202 connected to a base alarm 204. In the illustrated embodiment, smoke detector 202 is provided within smoke detector housing 206 and base alarm 204 is provided within base housing 208. In some cases, base housing 208 may be coupled to smoke detector housing 206 via an interlock coupling mechanism, as shown in FIG. 13. Other means of attachment may also be used. In other cases, base housing 208 may be formed integrally with smoke detector housing 206. In either case, a plurality of smoke inlets 210 are generally provided within the smoke detector housing 206 for allowing smoke particles to enter an interior chamber (otherwise referred to as a smoke detecting chamber) of the smoke detector 202. It should be understood that the configuration and number of smoke inlets is not limited to the embodiment shown in FIG. 12. In other embodiments, the smoke inlets may comprise a plurality of perforations formed within a substantially planar surface of the smoke detector housing.

FIG. 13 provides a cross-sectional view of the smoke alarm 200 shown in FIG. 12 to illustrate interior components of the smoke alarm in more detail, according to one embodiment. As shown in FIG. 13, smoke detector 202 includes interior smoke detecting chamber 220, the boundaries of which are defined, at least in part, by perforated sidewalls 222, cap 224 and bottom 230. Perforated sidewalls 222 allow air and smoke particles that enter the smoke inlets 210 of smoke detector housing 206 to flow into (and back out of) interior chamber 220. Light source 226 is disposed within interior chamber 220 for projecting a beam of light into the chamber. In the particular embodiment shown in FIG. 13, photoelectric receiver 228 is disposed outside of and below the interior chamber 220, particularly below a bottom 230 of chamber 220, for detecting light that is emitted from light source 226 (and possibly from other sources external to smoked detector 202). Although not shown in FIG. 13, smoke detector 202 may also include circuitry for converting the photocurrent generated by photoelectric receiver 228 into a signal voltage, which may be digitized and transmitted to a fire alarm system for further processing, or used to signal an alarm when the signal voltage reaches a predetermined level.

Light source 226 may be generally configured to emit one or more types of light (such as, e.g., infrared light, ultraviolet light and/or visible light). In some cases, light source 226 may be configured to emit multiple types of light (i.e., any type of light in addition to infrared light, ultraviolet light and/or visible light). In other cases, light source 226 may be configured to emit only one type of light (e.g., only infrared light, only ultraviolet light, or only visible light) and, in some cases, less than the entire spectrum of that type of light. In some cases, light source 226 may be configured to emit light having a peak spectral emission. In one particular example, light source 226 may be an infrared (IR) light emitting diode (LED) having a peak spectral emission of about 880 nanometers (nm) or about 950 nm. However, light source 226 is not limited to an LED or a particular peak spectral wavelength, and may alternatively be implemented with other light sources and/or configured for emitting other wavelength(s) of light.

Photoelectric receiver 228 may be generally configured to detect one or more types of light (such as, e.g., infrared light, ultraviolet light and/or visible light). In some cases, photoelectric receiver 228 may be configured to detect light within the spectrum of light emitted by light source 226, or may detect light within a predetermined range of the spectrum of light emitted by light source 226. In some of these cases, the photoelectric receiver may be configured to only collect light of a predetermined range, particularly a predetermined range of infrared light, ultraviolet light or visible light. In some cases, photoelectric receiver 228 may be specific to the peak spectral emission of light source 226. Alternatively, the photoelectric receiver may not be specific to the spectrum of light it is intended to receive from light source 226, and may be configured to detect substantially any spectrum of light. In some cases, photoelectric receiver 228 may be a broad spectrum receiver configured for collecting light over a relatively large wavelength range.

To minimize the amount of light entering or escaping the interior chamber 220 of smoke detector 202, the interior chamber is often made of a material, which is configured to block light or particular wavelengths of light from being transmitted there through. In one example, the sidewalls of interior chamber 220 (including perforated walls 222) and cap 224 may be formed from a material, which is configured to reflect and/or absorb a majority of the light within a predetermined spectrum, particularly the spectrum which photoelectric receiver 228 and/or the circuitry associated with the photoelectric receiver uses to generate voltage signals to signal the presence of smoke.

While this approach may reduce false triggering of smoke alarms when the photoelectric receiver of a smoke detector is disposed within the interior chamber 220, the present inventors have determined through extensive testing of different types of smoke detectors that it does not prevent false triggering of smoke alarms when the photoelectric receiver 228 is disposed outside of the interior chamber 220, as in the case of the smoke detector shown in FIGS. 12 and 13. The present inventors have determined that, when the photoelectric receiver 228 is disposed outside of the interior chamber 220, the photoelectric receiver may receive and detect certain types of ambient light. Specifically, the present inventors have determined that, when not protected by the light blocking material of interior chamber 220, photoelectric receiver 228 may receive and detect ultraviolet light, infrared light, and/or relatively high intensity visible light from the ambient environment in which the smoke alarm 200 is disposed. In particular, it was determined that some types of ambient light (e.g., ultraviolet light, infrared light, and/or higher intensity visible light) were being transmitted through the smoke detector housing 206 and/or the base housing 208 and impinging upon the photoelectric receiver 228, resulting in the generation of higher photocurrents and false alarms. Therefore, the present inventors concluded that additional shielding was needed to protect the photoelectric receiver 228 from receiving light from external light sources and to prevent false triggering of the smoke alarm 200. Various embodiments of smoke detector shields and related methods are provided herein for such purpose.

Some embodiments of the smoke detector shields described herein include an air path through the shield to allow air (and therefore, smoke particles if present) to be routed to the smoke inlets of a shielded smoke detector. In this manner, even when a smoke detector shield is installed onto a smoke detector, the smoke detector may still function to detect smoke in a room and trigger an alarm. In some cases, the air path may comprise a tortuous route to minimize the transmission of light through the smoke detector shield. In other cases, the smoke detector shield may be configured to surround at least a majority portion of the smoke detector, while leaving one or more smoke inlets of the smoke detector uncovered by the shield. In such cases, an unobstructed air path may be provided to the smoke inlets of the shielded smoke detector.

Other embodiments of smoke detector shields described herein may provide a light tight and/or airtight seal around a smoke detector by configuring the smoke detector shield to surround and enclose an entirety of the smoke detector when the smoke detector is installed or mounted upon a surface. Such shields may be considered for temporary use only, such as for a limited amount of time, or in instances when a light emission device is to be operated, which generates ultraviolet light, infrared light, and/or higher intensity visible light and/or generates ultraviolet light, infrared light, and/or visible light to cause a significant differential in any one or more of those spectral ranges of light in a room. Although not so limited, smoke detector shields for temporary use may be configured such that an individual standing on a floor of a room can quickly and easily install the shield (e.g., without having to employ a ladder to reach the smoke detector). In addition, embodiments of the smoke detector shields described herein may be configured to be readily portable.

Figure 2:
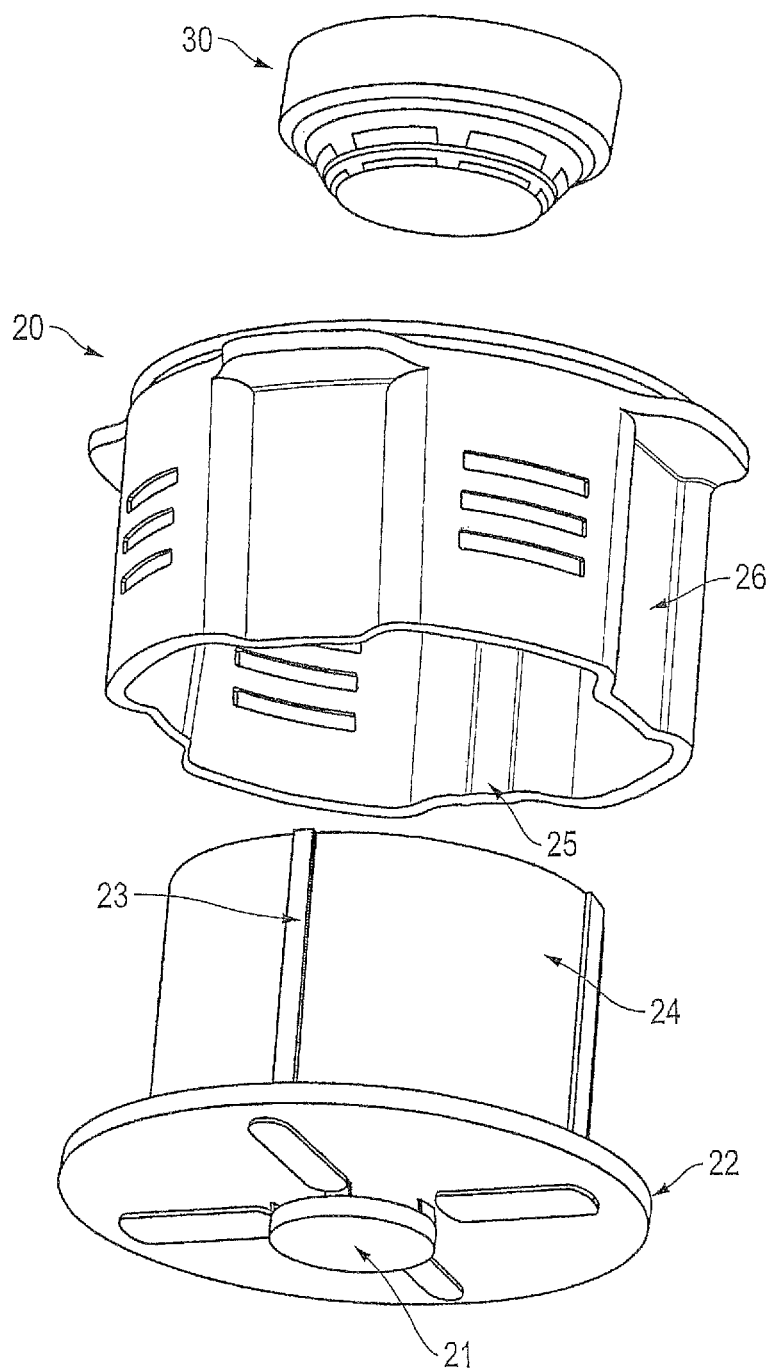
FIG. 2 is an exploded view of the smoke detector shield depicted in FIG. 1 in alignment with a smoke detector.
Figure 3:
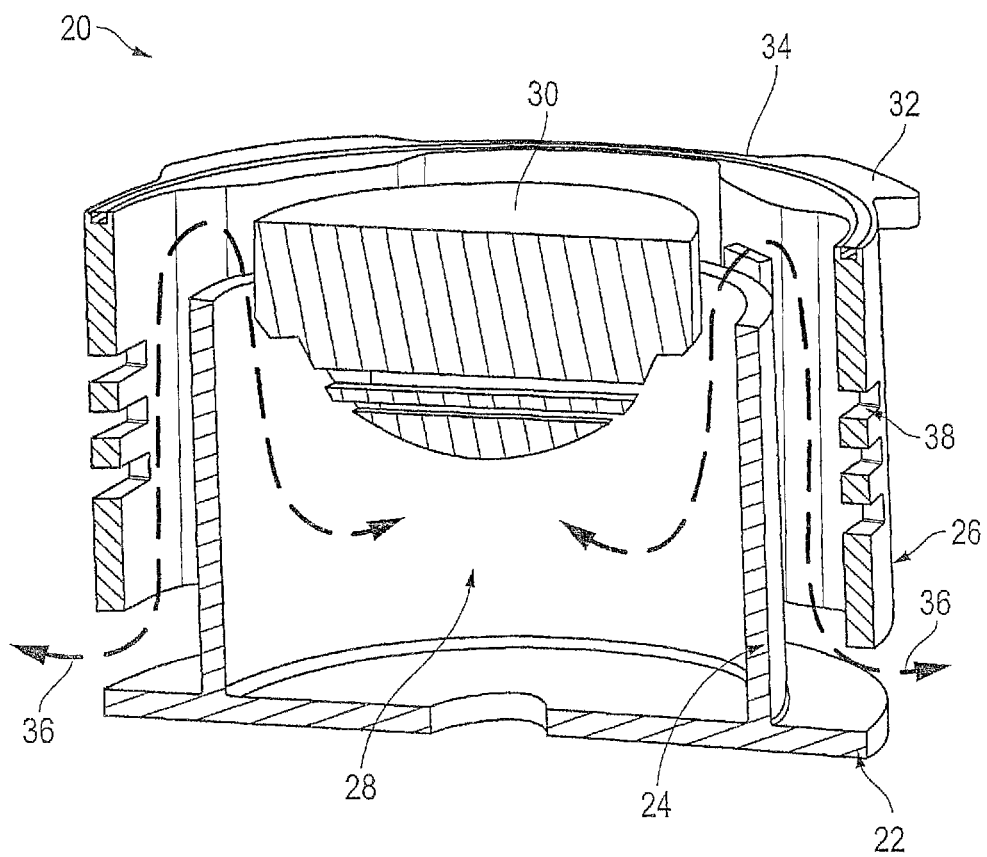
FIG. 3 illustrates a cross-sectional view of the smoke detector shield depicted in FIG. 1 installed around a smoke detector.
Figure 5:
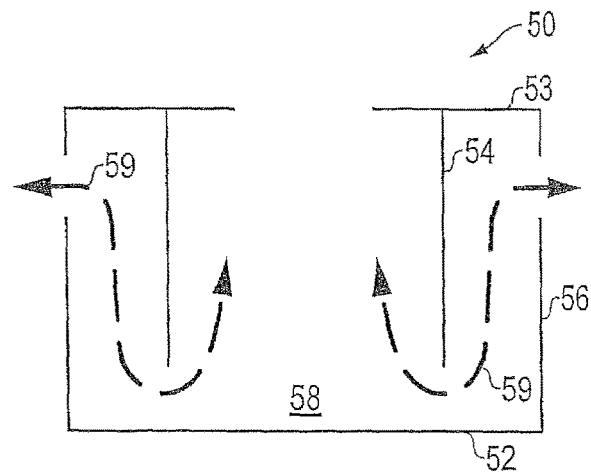
FIG. 5 illustrates a cross-sectional schematic view of an alternative smoke detector shield including a tortuous air path, according to a third embodiment.
Figure 6:
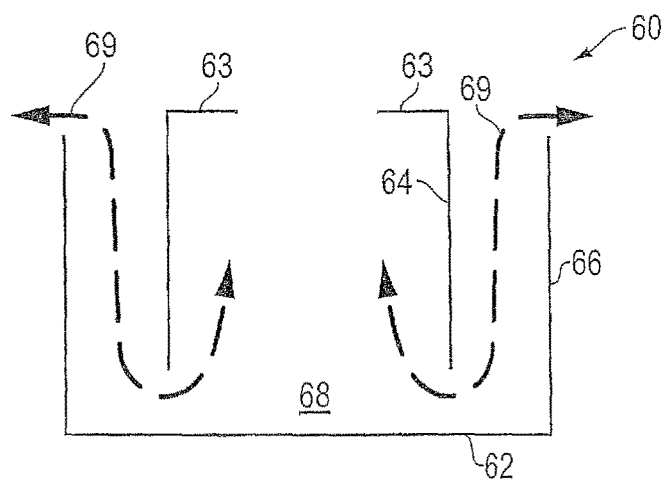
FIG. 6 illustrates a cross-sectional schematic view of an alternative smoke detector shield including a tortuous air path, according to a fourth embodiment.
Figure 7:
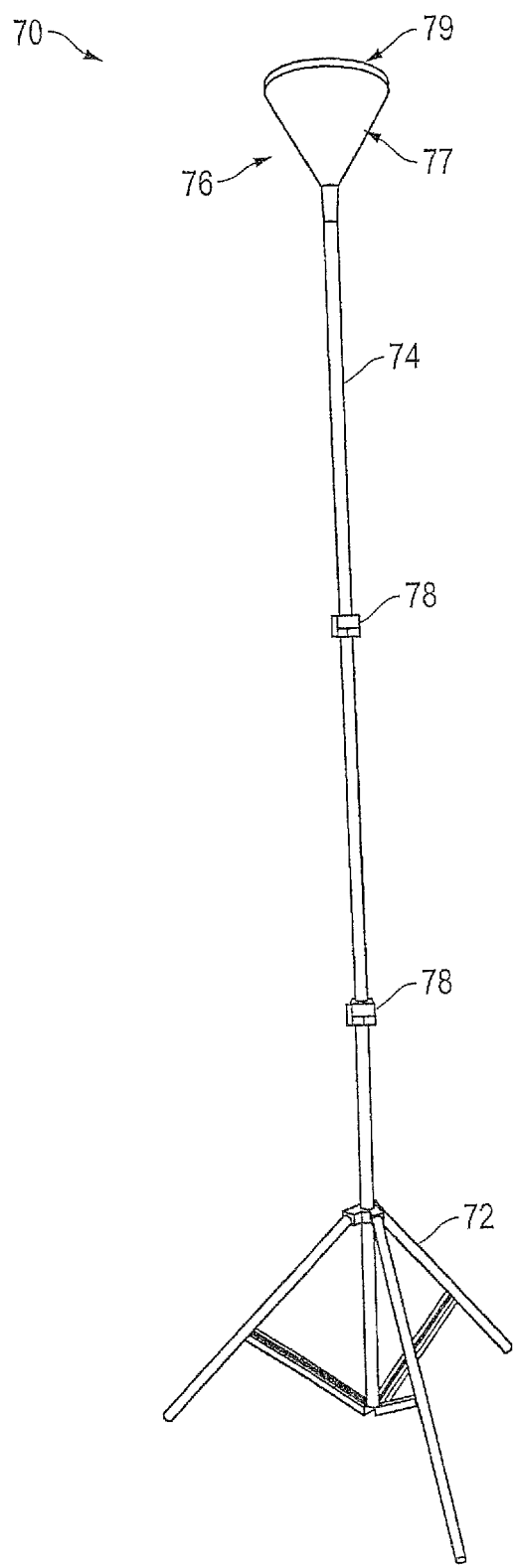
FIG. 7 illustrates a perspective view of a fifth embodiment a smoke detector shield including a shroud, a support base and a telescoping pole.
Figure 8:
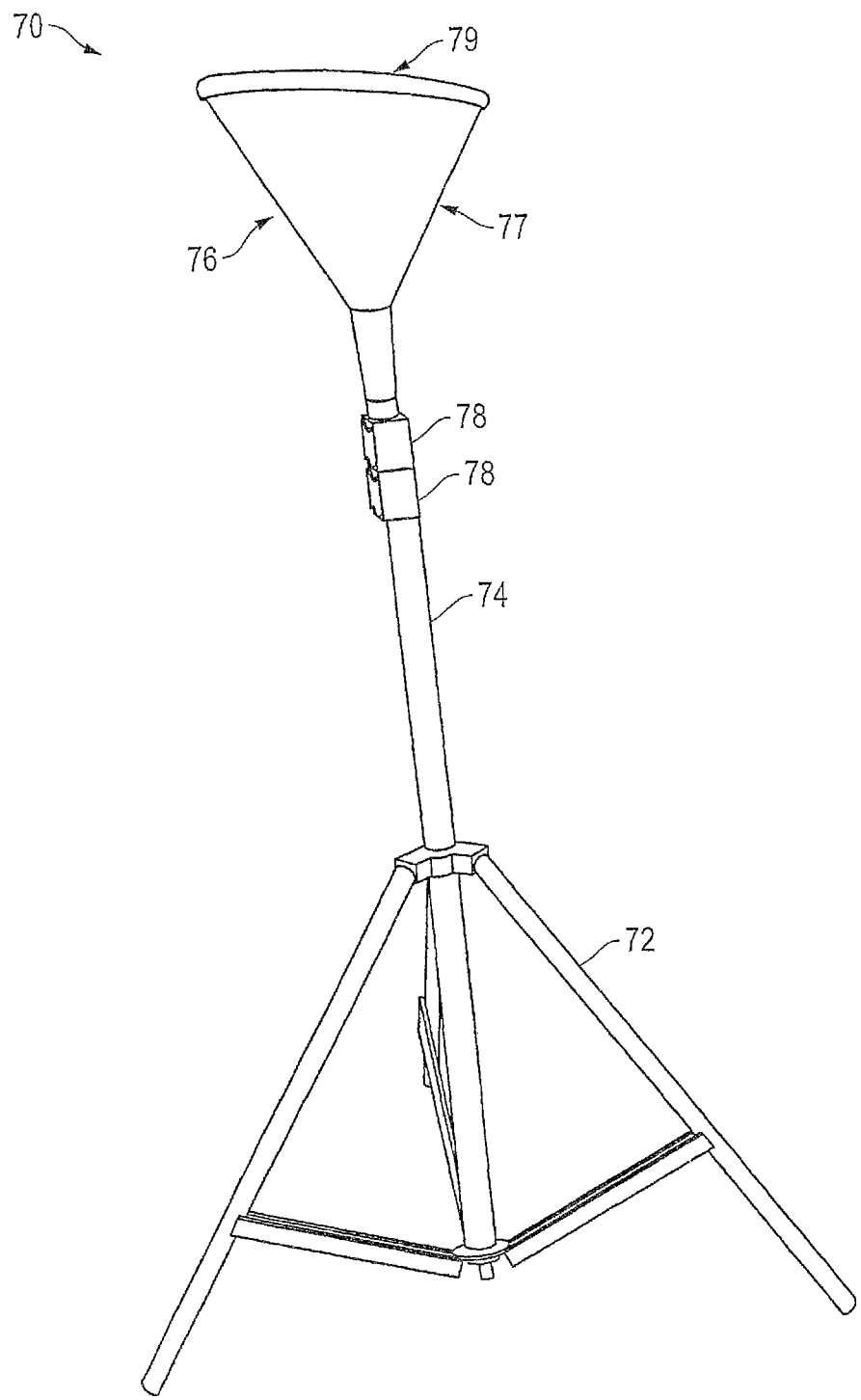
FIG. 8 illustrates the smoke detector shield depicted in FIG. 7 with its telescoping pole in a retracted position.
Figure 9:
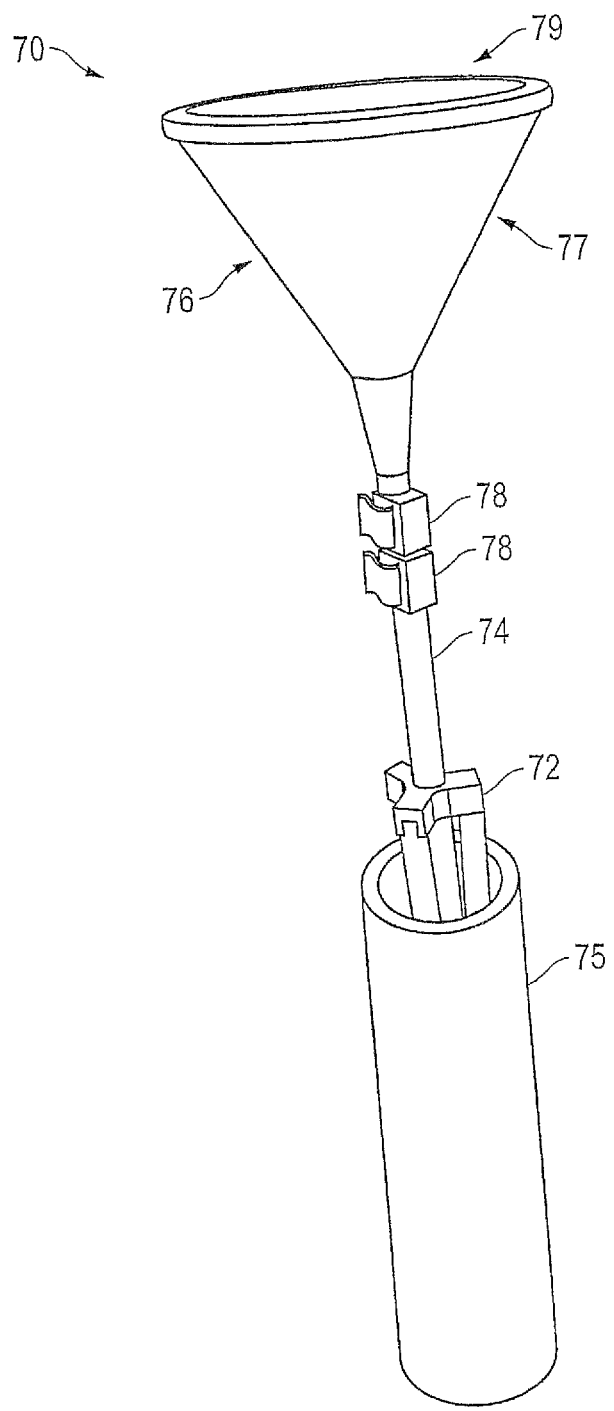
FIG. 9 illustrates the smoke detector shield depicted in FIG. 7 in a retracted position and placed in a container.

It is noted that the smoke detector shields described herein should not be limited to only those embodiments illustrated in the drawings. In particular, any of the smoke detector shields depicted in FIGS. 1-11 may include additional components not explicitly shown in the drawings. In addition, any of the smoke detector shields depicted in FIGS. 1-11 may include a rearrangement of parts (not shown in the drawings), which accomplishes the same objective described in reference to FIGS. 1-11. Furthermore, the drawings of FIGS. 1-11 are not necessarily drawn to scale. Moreover, the size and shape of the components of the smoke detector shields shown in FIGS. 1-11, as well as the size and shapes of the shields themselves, are considered to be exemplary. As an example, FIGS. 1-3 illustrate an embodiment of a smoke detector shield in the shape of a substantially right angle cylinder, and FIGS. 7-9 illustrate an embodiment of a substantially cone-shaped smoke detector shield, but any other shape may be considered for either embodiment. FIGS. 10A-B and 11A-B provide additional examples of smoke detector shields having alternative shapes and/or configurations, which accomplish the same or similar objectives described in FIGS. 1-3 and 7-9.

Some embodiments of the smoke detector shields described herein are configured to be attached or fastened to a smoke detector, or to a surface upon which the smoke detector is mounted, with one or more fasteners. It should be understood, however, that the smoke detector shields described herein are not limited to having fasteners of the type and location shown in the drawings. In particular, although FIGS. 1-3 illustrate the smoke detector shield affixed to a ceiling (or alternatively, a wall) of a room, embodiments of the smoke detector shields described herein may be alternatively configured for attachment to the smoke detector that it is configured to shield. In other embodiments, the smoke detector shields may not be attached or fastened to a smoke detector or to a mounting surface, and instead, may be configured to surround at least a majority portion of the smoke detector and press tightly against the mounting surface to provide a light tight and/or air tight seal at the mounting surface.

Returning to the drawings, FIGS. 1-3 illustrate a first embodiment of a smoke detector shield 20 including base plate 22, interior sleeve 24 and exterior sleeve 26. As shown in the drawings, interior sleeve 24 extends up from the base plate 22 and exterior sleeve 26 surrounds interior sleeve 24. Interior sleeve 24 may be coupled to exterior sleeve by protrusions 23 slidingly engaged within notches 25 of exterior sleeve 26, but other coupling mechanisms may be employed, such as but not limited to screws, adhesive, magnets, clamps or any other fastening means known in the art. In any case, as shown in the cross-sectional view of smoke detector 20 in FIG. 3, the assembly of exterior sleeve 26 to interior sleeve 24 along with base plate 22 forms open ended cavity 28 by which to receive a smoke detector, such as smoke detector 30 shown in FIGS. 2 and 3.

In general, interior sleeve 24 may be sized to accommodate at least a portion of a smoke detector, particularly the part of the smoke detector where the photoelectric receiver is located. In some cases, interior sleeve 24 may be particularly sized such that its upper surface extends at least 1 inch and, more specifically at least 2 or 3 inches, above the part of the smoke detector at which its photoelectric receiver is located when smoke detector shield 20 is secured around smoke detector 30. In any case, interior sleeve 24 may be additionally sized to provide a particular volume for air to pass in proximity to smoke detector 30. Although the volume that open ended cavity 28 may be configured to provide may vary widely depending on the size of the smoke detectors to be received and the amount of air desired in proximity to the smoke detectors, an example range of volume that open ended cavity 28 may provide may be between approximately 50 in$^3$ and approximately 300 in$^3$.

Figure 4:
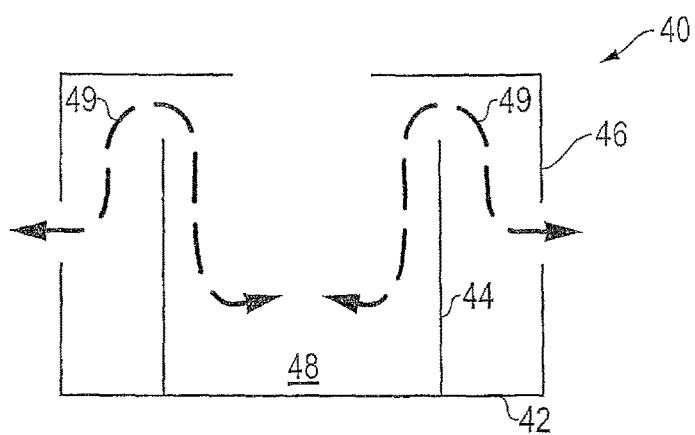
FIG. 4 illustrates a cross-sectional schematic view of an alternative smoke detector shield including a tortuous air path, according to a second embodiment.

In any case, although not shown in FIGS. 1-3, smoke detector shield 20 may include one or more fasteners for securing the smoke detector shield around a smoke detector. The fasteners may be used to secure exterior sleeve 26 to a ceiling or wall of a room to which smoke detector 30 is attached, particularly at tabs 32 of exterior sleeve 26. In other embodiments, smoke detector shield 20 may be configured such that fasteners may be used to secure exterior sleeve 26 to smoke detector 30. In yet other cases, smoke detector shield 20 may include a configuration in which interior sleeve 24 is fastened to smoke detector 30. Examples of alternative configurations of smoke detector shields accommodating such variations are shown in FIGS. 4-6 and described in more detail below. In any case, smoke detector 20 may optionally include an o-ring along the component which is used to secure the shield around a smoke detector, such as but not limited to o-ring 34 shown in exterior sleeve 26 in FIGS. 1-3.

As shown in FIGS. 1 and 3, the sidewalls of exterior sleeve 26 are spaced apart from the sidewalls of interior sleeve 24 other than at protrusions 23 and notches 25. In some cases, one or both of exterior sleeve 26 and interior sleeve 24 may include one or more concave sections to increase the volume of space between exterior sleeve 26 and interior sleeve 24, such as shown for exterior sleeve 26 in FIGS. 1-3. In other cases, however, exterior sleeve 26 and interior sleeve 24 may be void of concave sections. Furthermore, despite the depiction in the drawings of FIGS. 1-3, exterior sleeve 26, interior sleeve 24 and base plate 22 need not be circular and need not have the same shape as each other. In particular, exterior sleeve 26, interior sleeve 24 and base plate 22 may include any shape. Although the spacing between exterior sleeve 26 and interior sleeve 24 may vary, depending on the design specifications for a shield, an example range of spacings may be between approximately 0.5 inches and approximately 3 inches.

In any case, the spacing between exterior sleeve 26 and interior sleeve 24 provides a tortuous air path extending from an exterior of smoke detector shield 20 to open ended cavity 28 and vice versa as shown by dotted lines 36 in FIG. 3. More specifically, exterior sleeve 26 may be spaced apart from interior sleeve 24 with its lower edge spaced above the lower edge of interior sleeve 24 such that an air inlet is provided at the bottom of smoke detector shield 20 and an air route is provided along majority lengths of exterior sleeve 26 and interior sleeve 24. It is noted that base plate 22 need not extend out past interior sleeve 24, much less have an edge in alignment with the exterior edge of exterior sleeve 26. In any case, as is further shown in FIG. 3, interior sleeve 24 is sized to be spaced apart from smoke detector 30 such that the air path from between exterior sleeve 26 and interior sleeve 24 continues over an upper edge of interior sleeve into open ended cavity 28.

To further increase the air flow into open ended cavity 28 and vice versa, exterior sleeve 26 may include one or more air slits 38. In general, air slits 38 may be arranged anywhere along exterior sleeve 26 and, thus, their location should not be limited to that depicted in FIGS. 1-3. In yet other cases, air slits 38 may be omitted from exterior sleeve 26. In some embodiments, interior sleeve 24 may additionally or alternatively include one or more air openings, but yet in other cases, interior sleeve 24 may be absent of air openings. In some cases, smoke detector shield 20 may include one or more fans for drawing air into tortuous air path 36. The fan/s may be arranged at any locations along tortuous air path 36. In some cases, the fan/s may be light-powered, particularly by light generated in the room in which smoke detector shield 20 is arranged. For example, exterior sleeve 26 could include one or more light collecting cells that convert light energy into electricity. In other embodiments, however, smoke detector shield 20 may be void of a fan. In some cases, smoke detector shield 20 may include one or more baffles, tortuous channels or angled inlets to increase air flow to open ended cavity 28. For example, smoke detector shield 20 is shown in FIGS. 1 and 2 including baffle 21 at the bottom of base plate 22. Baffle 21 may be arranged at other locations within smoke detector shield 20, including other locations within base plate 22 below open ended cavity 28 or along exterior sleeve 26 or interior sleeve 24. In any case, baffle 21 may be configured to provide its own tortuous air path to open ended cavity 28. In other embodiments, however, baffle 21 may be omitted from smoke detector shield 20.

In any case, tortuous air path 36 is configured to minimize the transmission light to open ended cavity 28 from the ambient of smoke detector shield 20, but yet allow air flow therethrough such that smoke may be detected by the smoke detector. In some cases, the interior surface of exterior sleeve 26 and/or the exterior surface of interior sleeve 24 may include one or more materials which absorb infrared light, ultraviolet light and/or visible light to further minimize the transmission of such light to open ended cavity 28 and to prevent exposure of a photoelectric receiver of smoke detector 30 to such light. Examples of such materials may be Spectral Black™ or Spectral Black HP™ available from Acktar Ltd. of Kiryat-Gat, Israel, or solar heating coating products available from Kriya Materials of The Netherlands. In yet other embodiments, the interior surface of exterior sleeve 26 and/or the exterior surface of interior sleeve 24 may not include particular light absorbing materials. In one example, the exterior sleeve 26 and/or the interior sleeve 24 may be formed from and/or coated with one or more materials, which reflect infrared light, ultraviolet light and/or visible light to further minimize the transmission of such light to open ended cavity 28 of the smoke detector shield 20. Examples of such reflective materials include, but are not limited to, biaxially-oriented polyethylene terephthalate (aka Mylar™), aluminum foils and other radiant barrier foils.

Although tortuous air paths 36 are shown in FIG. 3 routed along a majority length of each of the interior sleeve and the exterior sleeve, smoke detector shield 20 is not necessarily so limited. For example, a schematic diagram of alternative smoke detector shield 40 is illustrated in FIG. 4 having an air intake arranged along a mid-section of the shield. In particular, smoke detector shield 40 is shown having base plate 42 with interior sleeve 44 and exterior sleeve 46 extending up therefrom. Exterior shield 46 includes one or more air openings to allow air to flow through the gap between interior sleeve 44 and exterior sleeve 46 without having an air inlet at the bottom of shield 46 as is described for smoke detector shield 20 of FIGS. 1-3. In alternative embodiments, exterior shield 46 may not extend to base plate 42 and, more particularly, may only extend to the opening shown in FIG. 4 at which air is allowed into the gap between interior sleeve 44 and exterior sleeve 46. In such cases, base plate 42 may include an upward lip along its periphery extending up to the opening shown in FIG. 4 at which air is allowed into the gap between interior sleeve 44 and exterior sleeve 46. In such cases, exterior sleeve 46 may not be directly coupled to base plate 42, but may be indirectly coupled to it by being coupled to interior sleeve 44 by respective notches and protrusions (or vice versa) such as described for smoke detector 20 described in reference to FIG. 3.

Furthermore, it is noted that smoke detector shields 20 and 40 are not limited to having interior sleeve 24 and 44 extending up from base plate 22 and 42, respectively. For example, schematic diagrams of alternative smoke detector shields 50 and 60 are illustrated in FIGS. 5 and 6 having interior sleeves 54 and 64 extending downward from upper plates 53 and 63 and spaced above based plates 52 and 62, respectively. In this manner, tortuous air paths 59 and 69 may be routed under a lower edge of interior sleeves 54 and 64 into open ended cavities 58 and 68, respectively, rather than being routed over an upper edge of their interior sleeves as is described in reference to smoke detector shield 20 in FIGS. 1-3. In the embodiment of FIG. 5, the opening in the exterior of the shield providing an air inlet for tortuous path 59 may, in some cases, be an air slit within exterior sleeve 56. In such cases, exterior sleeve 56 extends up to upper plate 53. In other cases, exterior sleeve 56 may be separated from upper plate 53 and, thus, the opening in the exterior of the shield providing an air inlet for tortuous path 59 may be a gap between the two components. In such cases, interior sleeve 54 may be coupled to exterior sleeve 56 by respective notches and protrusions (or vice versa) such as described for smoke detector 20 in reference to FIG. 3. Likewise, interior sleeve 64 of smoke detector shield 60 in FIG. 6 may be coupled to exterior sleeve 66 by respective notches and protrusions (or vice versa). Smoke detector shields 50 and 60 of FIGS. 5 and 6 further differ from smoke detector shields 20 and 40 of FIGS. 1-4 in that the upper plates 53 and 63 coupled to interior sleeves 54 and 64 are configured for attachment to a ceiling (or a wall) and/or to a smoke detector.

As noted above, the smoke detector shields described herein are not limited to the drawings. As such, it is noted that other smoke detector shield configurations may be considered that provide similar functionalities to those described in reference to FIGS. 1-6. In particular, other smoke detector shield configurations may be considered that provide an open ended cavity for receiving a smoke detector, a tortuous air path extending from an exterior of the smoke detector shield to the open ended cavity, and one or more fasteners for securing the smoke detector shield around a smoke detector. In one example, the tortuous air paths shown in FIGS. 1-6 may be omitted from any of smoke detector shields 20, 40, 50 and 60 and replaced with channels, baffles or angled inlets that provide their own tortuous air paths.

It is noted that the smoke detector shields described herein are not limited to providing a tortuous air path for routing air and smoke particles to the smoke inlets of a smoke detector. In other embodiments disclosed herein, smoke detector shields may be configured to surround and enclose an entirety of a smoke detector, which is installed or mounted upon a surface (e.g., a ceiling or a wall of a room), thereby providing a substantially light tight and/or substantially airtight seal around the smoke detector. As noted above, such embodiments may be considered for temporary use only, since they adversely affect the functionality of the smoke detector by substantially preventing air and smoke particles from entering the smoke inlets of the shielded smoke detector. In other embodiments disclosed herein, smoke detector shields may be configured to surround at least a majority portion of an installed smoke detector, while leaving one or more smoke inlets of the smoke detector uncovered by the shield. In such embodiments, the smoke detector shields may prevent a photoelectric receiver of a smoke detector from receiving and detecting ambient light, while providing an unobstructed air path to the smoke inlets of the smoke detector, thus maintaining full functionality of the smoke detector during shielding.

Turning to FIGS. 7-9, one example of an alternative smoke detector shield is depicted as being configured to surround and enclose an entirety of a smoke detector, which is mounted or installed on a ceiling of a room. In particular, FIGS. 7-9 depict smoke detector shield 70 specifically configured such that an individual standing on a floor of a room can install the smoke detector shield around a smoke detector without having to employ a ladder to reach the smoke detector. In addition, smoke detector shield 70 is configured to be readily portable. As shown in the embodiment of FIGS. 7-9, smoke detector shield 70 may include support base 72, shroud 76 and pole 74 coupled between support base 72 and shroud 76. Support base 72 is shown as a tripod in FIGS. 7-9, but other types of support bases may be considered that are sufficient to support pole 74 and shroud 76 and further facilitate smoke detector shield 70 as a readily portable and freestanding unit. Examples of other types of support structures that may be considered include, but are not limited to, solid masses in any shape (e.g., cylindrical, circular, conical, etc.). In some embodiments, support base 72 may be weighted to provide added stability. In other embodiments, support base 72 may be a collapsible tripod, such as shown for example in FIG. 9. Such a configuration may ease transport of smoke detector shield 70. However, support base 72 need not be collapsible, or even included as a component of smoke detector shield 70, in all embodiments. As such, the support base shown in FIGS. 7-9 is considered to be an exemplary configuration of an optional component of the smoke detector shield 70.

In some embodiments, support base 72 may be omitted from smoke detector shield 70. In such embodiments, pole 74 may be configured for supporting smoke detector shield 70 on a substantially horizontal surface of a room (e.g., a floor of a room, a piece of furniture, such as a table or dresser arranged within a room, a mobile cart wheeled into a room, etc.), while shroud 76 is positioned around a smoke detector. In such embodiments, pole 74 may include a first end, which is coupled to shroud 76, and a second end opposing the first end. When support base 72 is omitted, the second end of pole 74 may comprise a non-slip surface (e.g., one or more rubber feet) or other means for holding the second end of the pole 74 against the horizontal surface without slipping. When support base 72 (or an alternative support structure) is included, the second end of pole 74 may be coupled to the support base and/or to a substantially horizontal surface present within the room.

In some embodiments, pole 74 may comprise a fixed length, which cannot be changed, or an adjustable length, which can extend and/or contract. In some embodiments, pole 74 may have a length, or may be configured to extend to a length, of at least approximately 3.0 feet. In other embodiments, pole 74 may have a length, or may be configured to extend to a length, of at least approximately 5.0 feet. In some embodiments, pole 74 may have a length, or may be configured to extend to a length, such that opposing forces against a ceiling and floor of a room apply sufficient tension to hold the pole in place without the need for a support base 72. In such embodiments, the second end of pole 74 may be provided with a non-slip surface (e.g., one or more rubber feet) or other means for holding the second end of the pole 74 against a substantially horizontal surface without slipping.

Although not strictly limited to such, pole 74 may be a telescoping pole, as shown in the exemplary embodiment of FIGS. 7-9. In such embodiments, telescoping pole 74 may be configured to contract and lengthen to substantially any dimension, depending on the design specifications of smoke detector shield 70, the arrangement of a particular smoke detector within a room (e.g., on a wall or ceiling of the room), and/or one or more dimensions of the room. When configured as a telescoping pole, pole 74 may comprise one or more locking mechanisms 78 for fixing or locking the pole to a desired length, once the pole has been extended to the desired length for positioning shroud 76 around a smoke detector installed within a room.

In one embodiment, shroud 76, telescoping pole 74 and support base 72 (if included) may be sized, such that smoke detector shield 70 is able to attain a height of at least approximately 4 feet when smoke detector shield 70 is configured for shielding a smoke detector mounted onto a wall of a room. In order to shield a wall mounted smoke detector, telescoping pole 74 may further comprise one or more articulating joints, which may enable one or more sections of the pole to articulate or bend in a direction away from a longitudinal axis of the pole. In one embodiment, for example, locking mechanisms 78 may enable telescoping pole 74 to articulate, as well as extend, contract and lock into place. In other embodiments, pole 74 may comprise alternative means for articulation, and locking mechanisms 78 may only be used to extend, contract and lock the pole into place. If articulating joint(s) are included, smoke detector shield 70 may at times be used to shield a wall mounted smoke detector by positioning the support base 72 on a substantially horizontal surface (e.g., the floor) near the wall mounted smoke detector, extending the telescoping pole 74 to a desired length, and articulating or bending the articulating joint(s) in a direction, which enables the shroud 76 to be positioned around the wall mounted smoke detector and pressed against the wall to provide a substantially light tight and/or airtight seal around the smoke detector. Once shroud 76 is optimally positioned around the smoke detector, one or more of the locking mechanisms 78 and/or the articulating joint(s) may be locked in place to hold the shroud in the desired position.

When configured for shielding a smoke detector mounted on a ceiling of a room, shroud 76, telescoping pole 74 and support base 72 (if included) may be sized such that smoke detector shield 70 is able to attain a height of at least approximately 7 feet, at least approximately 9 feet and, in some cases, at least approximately 12 feet, depending on the particular dimensions of the room in which the smoke detector is installed. In some cases, telescoping pole 74 may comprise one or more articulating joints, as discussed above, so that the smoke detector shield 70 may be alternately used for shielding both wall mounted and ceiling mounted smoke detectors. In other cases, telescoping pole 74 may not include articulating joints, and may only include one or more locking mechanisms 78 for extending, contracting and locking the telescoping pole in place. In either case, smoke detector shield 70 may be used to shield a ceiling mounted smoke detector by positioning the support base 72 (or the second end of pole 74) on a substantially horizontal surface (e.g., the floor) below the ceiling mounted smoke detector, and extending the telescoping pole 74 to a desired length, which enables the shroud 76 to be positioned around the ceiling mounted smoke detector and pressed against the ceiling to provide a substantially light tight and/or airtight seal around the smoke detector. Once the shroud 76 is optimally positioned around the smoke detector, one or more of the locking mechanisms 78 may be locked in place to hold the shroud in the desired position.

FIGS. 8 and 9 illustrate embodiments in which telescoping pole 74 is retracted and support base 72 is collapsed, respectively. In some embodiments, the telescoping pole 74 may be configured, such that a length of the smoke detector shield 70 may be reduced down to a range between approximately 2 feet and approximately 5 feet. More specifically, shroud 76, telescoping pole 74 and support base 72 (if included) may be sized such that a retracted length of smoke detector shield 70 is between approximately 2 feet and approximately 5 feet. Although not restricted to such, reducing the length of smoke detector shield 70 down to such a range may, in some cases, enable easier transport and/or storage of the smoke detector shield 70. As shown in FIG. 9 and discussed in more detail below, providing the smoke detector shield 70 with a collapsible support base 72 (or omitting the support base altogether) and contracting the smoke detector shield 70 to a more compact length/size may enable the smoke detector shield 70 to be stored within a container 75 used for transport and/or storage.

In some embodiments, smoke detector shield 70 may be placed in a container for transport and/or storage. One example of such a container 75 is shown in FIG. 9, but containers of various other configurations may be considered for transporting and/or storing embodiments of the smoke detector shields described herein. In some embodiments, container 75 (or any alternative container configured to hold at least a portion of a smoke detector shield disclosed herein) may be attached to a transport device such as a cart, or any other moveable device used in conjunction with smoke detector shield 70. It is noted that the configuration of smoke detector shield 70 depicted in FIGS. 7-9 facilitates easy transport and use of the smoke detector shield without having to disassemble it, but the smoke detector shield is not necessarily so limited. In particular, it is noted that smoke detector shield 70 may include one or more quick release mechanisms, which enable smoke detector shield 70 to be easily disassembled for storage and/or transport, and further enable the smoke detector shield 70 to be assembled relatively easily and quickly for shielding a smoke detector.

Other embodiments of smoke detector shields described herein may also be placed in container 75 for storage and/or transport.

As shown in FIGS. 7-9, shroud 76 is coupled to an upper end (i.e., the first end) of telescoping pole 74. In some cases, shroud 76 may include an outer shell 77 comprising a substantially rigid material and a liner 79 extending above the upper surface of the substantially rigid outer shell 77. Examples of substantially rigid materials that may be used to form the outer shell 77 include, but are not limited to, a modified polyphenyene ether/olefin resin blend (e.g., a Noryl™ resin), poly(methyl methacrylate) (aka, Plexiglas™), polycarbonate, wood, and various metals or metalized materials (e.g., gold, aluminum, etc.). By providing shroud 76 with a substantially rigid outer shell 77, the shroud may be positioned around a smoke detector with enough force to press the substantially pliant liner 79 against a surface upon which the smoke detector is mounted, thereby providing an airtight and/or light-tight seal against the mounting surface without collapsing the shroud or substantially deforming its intended shape.

As used herein, a substantially rigid material may be one which resists significant deformation when subjected to an amount of force that is achievable by applied human strength. An amount of force achievable by applied human strength, as used herein, generally refers to an amount of force which can be applied by one or more hands directly handling and pushing on an object, or the amount of force which can be applied by manual manipulation of a component coupled to an object (e.g., the pressure applied by a human manipulating a pole attached to a substantially rigid smoke detector shield, such as described in reference to FIGS. 7-9). The resistance of significant deformation for a substantially rigid material may generally refer to maintaining substantially the same size and shape of the substantially rigid material, particularly for its intended use. For instance, a substantially rigid material of a smoke detector shield may generally maintain its size and shape upon applied force such that the shield sufficiently surrounds an intended portion of a smoke detector.

In contrast, a substantially pliant material, as used herein, is a material which substantially changes is size or shape when subjected to an amount of force that is achievable by applied human strength. It is noted the aforementioned definitions of substantially rigid and substantially pliant materials do not restrict the smoke detector shields described herein to manual installation, nor do they imply that substantially pliant materials of a smoke detector need be deformed upon installation around a smoke detector. Furthermore, the aforementioned definitions of substantially rigid and substantially pliant materials do not restrict the pressure in which the smoke detector shields described herein may be installed. Rather, the reference of deformation in reference to applied human strength is merely used to distinguish the terms. It is contemplated that the smoke detectors described herein may be installed by mechanical devices and/or automated devices, either of which may apply any suitable pressure for the installation including pressures greater than what may be attainable by human strength.

In some embodiments, the liner 79 may comprise a substantially pliant material that allows deformation, so that liner 79 conforms to the mounting surface upon which the smoke detector is installed. A substantially pliant liner 79 may be advantageous in providing an airtight and/or light tight seal against the mounting surface (e.g., a ceiling or wall), and/or in preventing marring of the mounting surface when shroud 76 is positioned for covering a smoke detector. A compressible foam is one example of a substantially pliant material that may be used to form the substantially pliant liner 79. Other type of substantially pliant materials may also be considered for the liner and, thus, the liner should not be restricted to being foam. In any case, shroud 76 may, in some embodiments, be configured to provide an airtight and/or light-tight seal around a smoke detector. In other cases, shroud 76 may comprise air vents and a tortuous air path extending from the air vents to an interior cavity of the shroud, such as discussed above for the smoke detector shields described in reference to FIGS. 1-6.

Figures 10A, 10B:
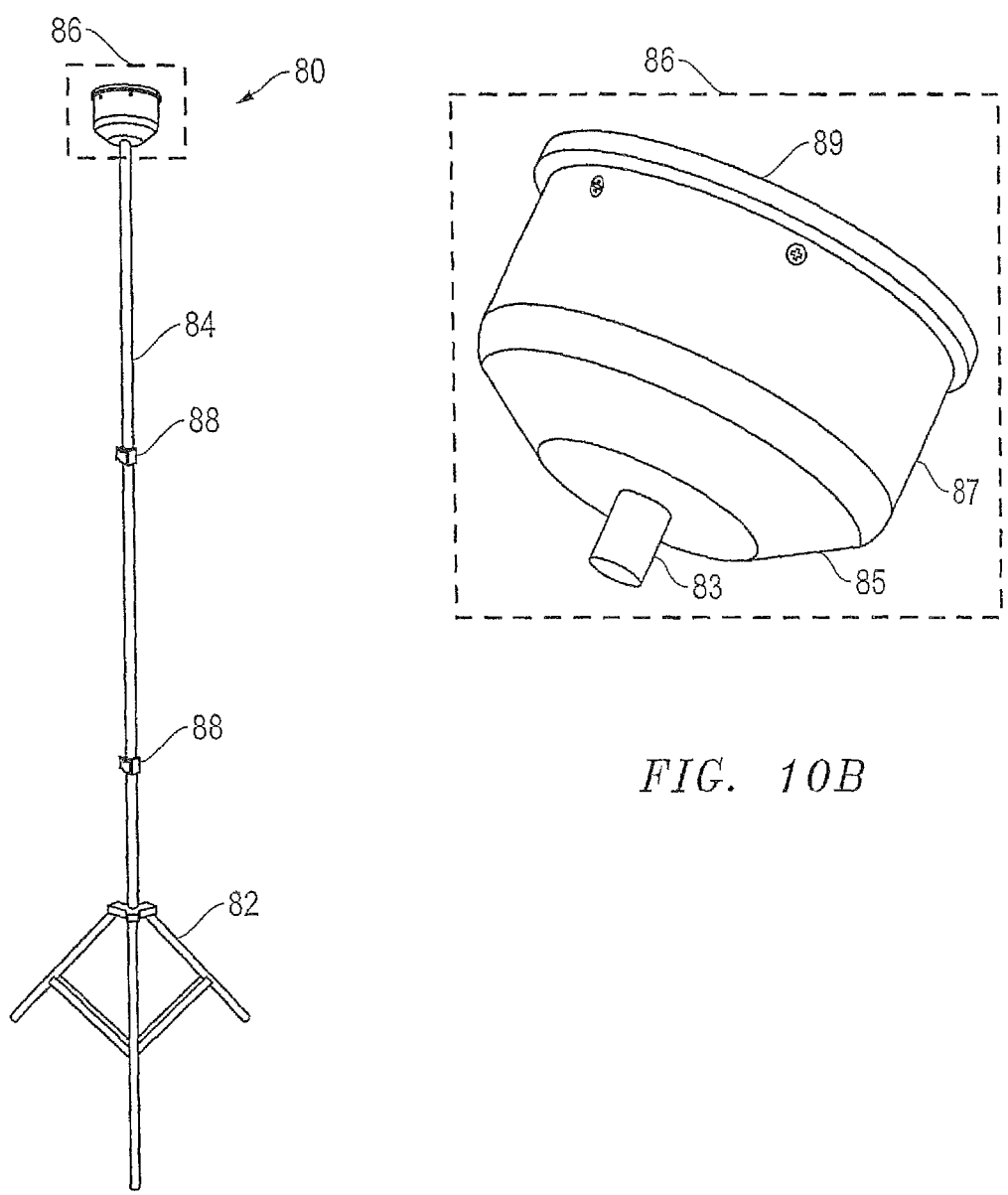
FIG. 10A illustrates a perspective view of an alternative smoke detector shield including a shroud, a support base and a telescoping pole, according to a sixth embodiment.
FIG. 10B illustrates an enlarged view of the shroud depicted in FIG. 10A.

FIGS. 7-9 illustrate shroud 76 as being substantially cone-shaped, but any other shape may be considered for the shroud, so long as it surrounds and encloses a majority portion of a smoke detector. As one example, FIGS. 10A-10B illustrate an alternative embodiment of a smoke detector shield 80 comprising a shroud 86, a pole 84 and an optional support base 82. Pole 84 and support base 82 may be configured similar to that shown and described above in reference to smoke detector shield 70 of FIGS. 7-9.

For example, pole 84 may be a fixed length pole or a telescoping pole that comprises a length, or is configured to extend to a length, which is sufficient to position shroud 86 around a smoke detector mounted onto a wall or ceiling of a room. Exemplary lengths attainable by pole 84 and/or smoke detector shield 80 are discussed above in reference to FIGS. 7-9. If pole 84 is a telescoping pole, one or more locking mechanisms 88 may be provided to enable the pole to extend, contract and lock into place. In some embodiments, pole 84 may include one or more articulating joints, as discussed above. In some embodiments, support base 82 may be a tripod, a collapsible tripod or another support structure, as further discussed above. Alternatively, support base 82 may be omitted from smoke detector shield 80, and a second end of pole 84 may be configured for supporting smoke detector shield 80 on a substantially horizontal surface. Similar to the previously described embodiment, shroud 86 may comprise a substantially rigid outer shell 87, and a substantially pliant liner 89 extending above the upper surface of the substantially rigid outer shell 87. Material choices for the substantially rigid outer shell 87 and substantially pliant liner 89 may be similar to those discussed above for outer shell 77 and liner 79.

One difference between the smoke detector shield 70 shown in FIGS. 7-9 and the smoke detector shield 80 shown in FIGS. 10A and 10B is the shape of the respective shrouds 76 and 86. Unlike the substantially cone-shaped shroud 76 shown in FIGS. 7-9, the outer shell 87 of shroud 86 comprises a more annular or cylindrical shape. In some cases, the cylindrical shape of the outer shell 87 may enable the smoke detector shield 80 to encapsulate smoke detectors of different shapes and sizes better than the cone shaped shroud 76 shown in FIGS. 7-9. In other cases, the cylindrical shape of the outer shell 87 may enable a height of shroud 86 to be reduced, as compared to the cone shaped shroud 76 shown in FIGS. 7-9.

As shown in FIGS. 10A-10B, a lower portion 85 of shroud 86 comprises a connector 83, which may be configured for attachment to the pole 84. In some embodiments, lower portion 85 may be formed from the same material used to form the substantially rigid outer shell 87, or from a substantially different material having the same or different properties. Although lower portion 85 is illustrated in FIGS. 10A-10B as having a substantially funnel-shaped longitudinal cross-section, lower portion 85 is not necessarily limited to such, and may be alternatively configured in other embodiments. In one alternative embodiment, for example, lower portion 85 may be a substantially planar surface.

In some cases, one or more embodiments of the smoke detector shields considered herein may comprise at least one quick release device for detaching the pole from the shroud. In the embodiment shown in FIGS. 10A-10B, for example, a quick release device may be incorporated within, or may be coupled to, connector 83 for attaching and detaching the pole 84 from the shroud 86. In some cases, a quick release device located at or near the connector 83 may be used to detach the pole 84 from the shroud 86 after the smoke detector shield 80 has been installed and retained on a smoke detector. In other cases, a quick release device located at or near the connector 83 may be used to detach the pole 84 from the shroud 86 for transport and/or storage purposes.

In some embodiments, one or more additional quick release devices may be provided along a length of pole 84 to further aid in the disassembly of the pole into two or more sections, thereby further aiding in the transport and/or storage of the smoke detector shield 80. In one exemplary embodiment, locking mechanisms 88 may comprise or may function as quick release devices for assembling and disassembling the pole 84 into sections. Various configurations of quick release mechanisms may also be provided for other embodiments of the smoke detector shields described herein.

The quick release devices described herein may include any quick release device known in the art, such as but not limited to a quick-release spring, a quick-release clamp or male/female threaded connectors. In some embodiments, a mechanism for activating the quick release device may be arranged along and/or within the pole, particularly along or within approximately 2 feet to approximately 5 feet of the second end of the pole (i.e., the end opposing the shroud) such that an individual installing the smoke detector shield may have easy access to the mechanism. For example, if the quick release device located at or near the connector 83 were a quick-release spring or clamp, it may be desirable to provide a mechanism, which is arranged along the pole within reach of the individual installing the smoke detector shield, when the smoke detector shield is installed onto a ceiling mounted smoke detector. Such a mechanism may be provided, so that the individual can easily activate the quick release device without the assistance of a ladder. However, a mechanism for activating a quick release device may not strictly be required. If, for example, connector 83 and the first end of the pole 84 were to respectively comprise female and male threaded connectors (or vise versa), an individual installing smoke detector shield 80 may detach pole 84 from the connector 83 by simply gripping the pole at any desirable height and rotating the pole in a clockwise or counter clockwise direction until the male connector disengaged from the female connector.

In the embodiments in which it is desirable to detach the pole from the shroud, the shroud may include one or more fasteners for coupling the shroud to a smoke detector and/or to a surface to which the smoke detector is attached (e.g. a ceiling or wall of a room). The fastener/s may generally be manipulated by an individual installing the smoke detector. In one example, the shrouds 76 and/or 86 of smoke detector shields 70 and 80 may be configured to suction to a smoke detector and/or to an adjacent surface. In addition or alternatively, shrouds 76 and/or 86 may include a clamp, a collar or an elastic band, which is configured to clasp around a smoke detector. In contrast to the configuration of the smoke detector shield described above in reference to FIGS. 7-10 in which the shroud is secured around smoke detector by tension in the pole, the shroud for the embodiment in which the pole used to install the shroud is removed by a quick release device may, in some cases, include one or more fasteners for coupling the shroud to the smoke detector and/or to the mounting surface.

Two different configurations of smoke detector shields have been disclosed thus far. In FIGS. 1-6, for example, a first configuration of a smoke detector shield 20, 40, 50, and 60 is provided with an open ended cavity for receiving a smoke detector, a tortuous air path extending from an exterior of the smoke detector shield to the open ended cavity, and one or more fasteners for securing the smoke detector shield around a smoke detector. In this configuration, the base, interior sleeve and/or exterior sleeve of the shield are preferably configured to block the transmission of infrared light, ultraviolet light and/or higher intensity visible light through the shield. In this manner, smoke detector shields 20, 40, 50, and 60 may be configured to mitigate false tripping of spot type photoelectric smoke detectors by preventing light from reaching the photoelectric receiver disposed therein. In this first configuration, the functionality of a particular smoke detector (such as the smoke detector shown in FIGS. 12 and 13) is reasonably maintained during shielding by providing a tortuous air path within the smoke detector shields 20, 40, 50, and 60 for routing air and smoke particles to the smoke inlets of the smoke detector enclosed therein. As such, smoke detector shields 20, 40, 50, and 60 may be used to protect a particular smoke detector (such as the smoke detector shown in FIGS. 12 and 13) in a somewhat permanent installation. However, this configuration may not be universally adaptable to all of the many different types and configurations of commercially available smoke detectors.

A second configuration of a smoke detector shield 70, 80 is shown in FIGS. 7-10 and described above. In this configuration, a shroud 76, 86 is provided to surround and enclose an entirety of a smoke detector, which is installed or mounted upon a surface (e.g., a ceiling or a wall of a room), thereby providing a substantially light tight and/or airtight seal around the smoke detector. By forming the shroud 76, 86 from a material, which blocks the transmission of infrared light, ultraviolet light and/or higher intensity visible light, smoke detector shields 70 and 80 may be used to mitigate false tripping of spot type photoelectric smoke detectors by preventing light from reaching the photoelectric receiver disposed therein. Since the smoke detector is completely enclosed within the shroud 76, 86, the smoke detector shields 70 and 80 described in the second configuration may be universally applied to many different types and configurations of commercially available smoke detectors. However, the functionality of the smoke detector is hampered by the smoke detector shields 70 and 80. As such, this type of smoke detector shield may only be used for temporary use.

Figures 11A, 11B:
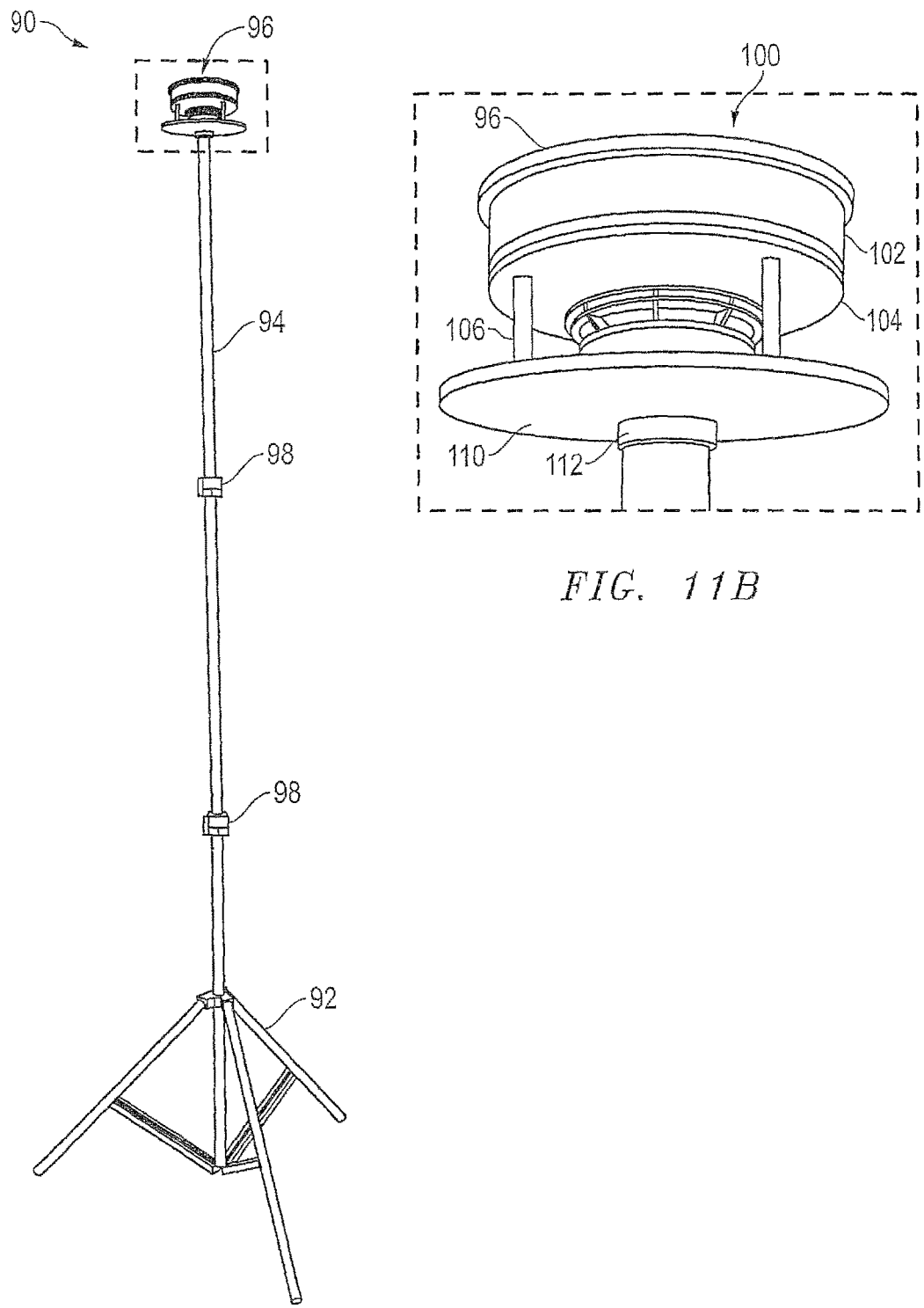
FIG. 11A illustrates a perspective view of a seventh embodiment of a smoke detector shield including a shroud configured to cover at least a portion of a smoke detector, while leaving one or more smoke inlets of the smoke detector uncovered by the shroud.
FIG. 11B illustrates an enlarged view of the smoke detector shield depicted in FIG. 11A.
Figure 11C:
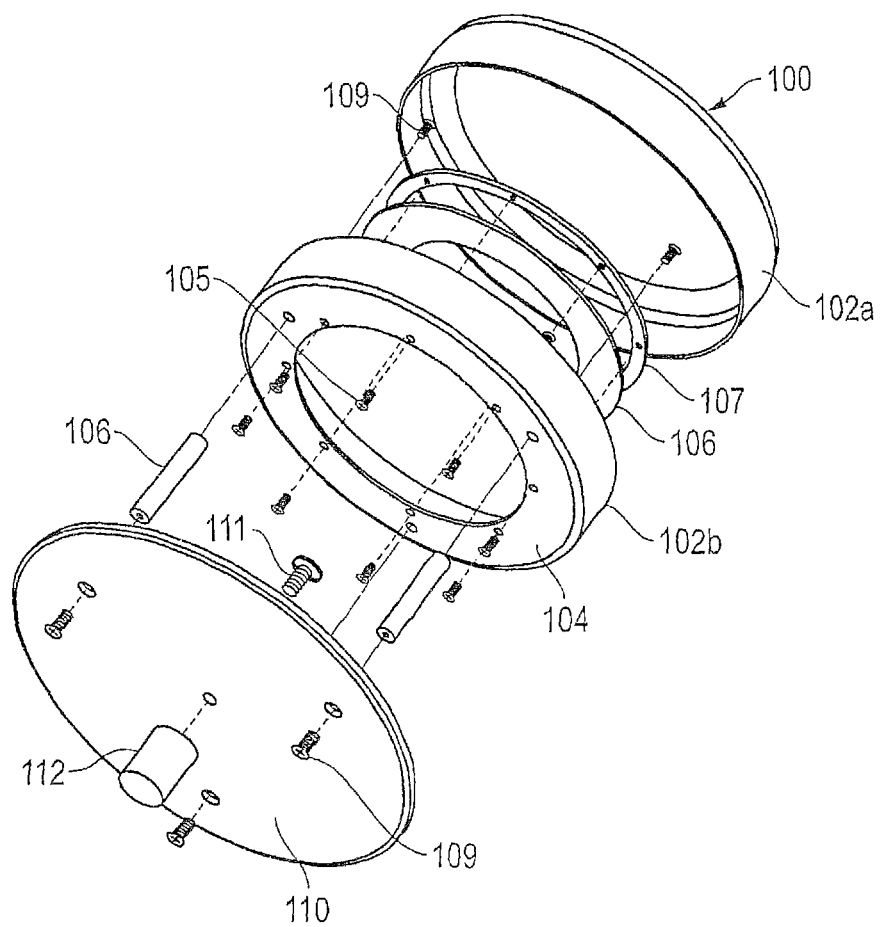
FIG. 11C illustrates an exploded view of the smoke detector shield depicted in FIG. 11A.

FIGS. 11A-11C illustrate a third configuration of a smoke detector shield 90, which may be used to mitigate false tripping of spot type photoelectric smoke detectors, while maintaining full functionality of a wide variety of smoke detectors that may be disposed therein. In the third configuration, smoke detector shield 90 is configured to surround at least a majority portion of an installed smoke detector, while leaving one or more smoke inlets of the smoke detector uncovered by the shield. In this manner, smoke detector shield 90 may prevent a photoelectric receiver of a spot type photoelectric smoke detector from receiving ambient light, while providing an unobstructed air path to one or more smoke inlets of the smoke detector, thus maintaining full functionality of the smoke detector during shielding.

Like the previous embodiments of smoke detector shields shown in FIGS. 7-10, smoke detector shield 90 may generally include a shroud 96, a pole 94 and an optional support base 92. Pole 94 and support base 92 may be configured similar to that shown and described above in reference to smoke detector shields 70 and 80 of FIGS. 7-10. For example, pole 94 may be a fixed length pole or a telescoping pole having a length, or may be configured to extend to a length, which is sufficient to position shroud 96 around a smoke detector mounted onto a wall or ceiling of a room. Exemplary lengths attainable by pole 94 and/or smoke detector shield 90 are discussed above in reference to FIGS. 7-9. If pole 94 is a telescoping pole, one or more locking mechanisms 98 may be provided to enable the pole to extend, contract and lock into place. In some embodiments, pole 94 may further include one or more articulating joints and/or one or more quick release devices, as discussed above. In some embodiments, support base 92 may be a tripod, a collapsible tripod or another support structure, as further discussed above. Alternatively, support base 92 may be omitted from the smoke detector shield, and a second end of pole 94 may be configured for supporting smoke detector shield 90 on a substantially horizontal surface.

In general, shroud 96 differs from the shrouds and sleeves shown in the previous embodiments by surrounding and covering a majority portion of an installed smoke detector, while leaving one or more smoke inlets of the smoke detector (such as smoke inlets 210 of smoke detector 200 of FIGS. 12 and 13) uncovered by the shroud. In some embodiments, a "majority portion" may include at least the base housing 208 of a smoke detector, as shown in the example smoke detector 200 embodiment of FIG. 12. In some embodiments, the "majority portion" may additionally include a portion of the smoke detector housing 206 protruding from the base housing 208 and extending up to the one or more smoke inlets 210. In either embodiment, the "majority portion" preferably encompasses a photoelectric receiver 228 of the smoke detector 200, especially when the photoelectric receiver is disposed outside of the light-blocking material of the interior chamber 220, as shown in FIG. 13. In some embodiments, the shroud 96 may be configured to expose substantially all of the smoke inlets 210 of the smoke detector 200. In other embodiments, a smaller portion of the smoke inlets 210 may be covered by the shroud 96, while a larger portion of the smoke inlets 210 remain exposed to enable air and smoke particles to enter the exposed smoke inlets. Although shroud 96 is illustrated in FIGS. 11A-11B as being configured for surrounding and covering a particular configuration of smoke detector (such as the smoke detector 200 shown in FIGS. 12 and 13), shroud 96 is not so limited. In general, shroud 96 may be dimensionally configured to surround and cover a majority portion of any type/configuration of smoke detector, while leaving one or more smoke inlets of the smoke detector uncovered by the shroud.

In one embodiment, shroud 96 may be described as having a first end 100, a second end 104 opposing the first end 100, one or more sidewalls 102 extending between the first and second ends, and a seal 106. The first end 100 of the shroud may be described as having an opening, which is dimensionally configured to receive a smoke detector mounted onto a surface (such as a ceiling or wall of a room). Likewise, the second end 104 of the shroud may be described as having an opening, which is dimensionally configured to expose one or more smoke inlets of the received smoke detector. The one or more sidewalls 102 extending between the first and second ends 100/104 may be described as collectively configured to surround a majority portion of the received smoke detector without covering the smoke inlets exposed by the opening in the second end 104. In some embodiments, a seal 106 may be disposed at least along a peripheral edge of the opening in the second end 104 of the shroud 96. As described in more detail below, the seal 106 may be dimensionally configured to conform to an exterior surface of the received smoke detector, so as to provide a light tight and/or airtight seal at the exterior surface of the received smoke detector.

As noted above, shroud 96 is not limited to any particular type/configuration of smoke detector, and in some cases, may be used to protect many different shapes, sizes and configurations of smoke detectors. In some embodiments, the opening in the first end 100 of the shroud 96 may range between about 4 inches and about 12 inches in diameter. In one particular example, the opening in the first end 100 may be about 6 inches in diameter to accommodate smoke detectors typically used in residential, commercial and/or healthcare settings. It is noted, however, that such a diameter is merely exemplary and may be substantially smaller or larger to accommodate different sizes of smoke detectors.

In some embodiments, the opening in the second end 104 of the shroud 96 may range between about 2 inches and about 10 inches in diameter. In one particular example, the opening in the second end 104 may be about 4 inches in diameter to accommodate smoke detectors typically used in residential, commercial and/or healthcare settings. It is noted, however, that such a diameter is merely exemplary and may be substantially smaller or larger to accommodate different sizes of smoke detectors and/or to accommodate different configurations or arrangements of smoke inlets on such smoke detectors. It is further noted that the depiction in the figures of the size, shape and/or location of the opening in the second end 104 of the shroud 96 is also exemplary. Although the opening in the second end 104 is depicted in the figures as a relatively large circular opening, which is centered within the second end 104, it is not limited to such, and may be alternatively shaped, sized and/or arranged to coincide with a particular configuration and/or arrangement of smoke inlets on other types of smoke detectors.

In the particular embodiment shown in FIGS. 11A-11C, shroud 96 comprises only one sidewall 102, which is substantially annular or cylindrical in shape. It is noted, however, that the one or more sidewall(s) 102 of the shroud are not limited to any particular number or shape, and may comprise substantially any shape, which is similar or dissimilar to the shape of the received smoke detector. In one particular example, shroud 96 may comprise four sidewalls 102 forming a rectangular prism. Alternative numbers of sidewalls forming alternative shapes may also be considered. In some embodiments, a height of the sidewall(s) 102 may range between about 1 inch and about 6 inches. In one particular example, the height of the sidewall(s) 102 may be about 3 inches to accommodate smoke detectors typically used in residential, commercial and/or healthcare settings. It is noted, however, that such a height is merely exemplary and may be substantially smaller or larger to accommodate different sizes of smoke detectors.

In some embodiments, the first end 102, second end 104 and sidewall(s) 102 of the shroud 96 may be formed together as a single component. For example, a molding process may be used to form the component comprising the first end 100, the second end 104 and the one or more sidewalls 102. In such an embodiment, the first end 100, the second end 104 and the one or more sidewalls 102 may be formed from the same material, and in some cases, from a material that becomes substantially rigid once formation is complete. As noted above, a substantially rigid material may enable the shroud 96 to resist deformation when the smoke detector shield 90 is installed onto a smoke detector, especially when using the pole installed method depicted in FIG. 11A. Examples of substantially rigid materials include, but are not limited to, a modified polyphenyene ether/olefin resin blend (e.g., a Noryl™ resin), poly(methyl methacrylate) (aka, Plexiglas™), polycarbonate, wood, and various metals or metalized materials (e.g., gold, aluminum, etc.). However, other substantially rigid materials may be used to form the shroud 96.

In other embodiments, two or more separately formed components may be coupled together to form the shroud 96. As shown in the exemplary assembly diagram of FIG. 11C, for example, shroud 96 may be formed by coupling a first end 100 comprising sidewalls 102a to a second end 104 comprising sidewalls 102b. The first and second ends 100/104 may be coupled together by substantially any means, including but not limited to adhesives, threading on the interior/exterior surfaces of sidewalls 102a/102b, and mechanical fasteners (such as, e.g., screws, clips, clamps, etc.) to name a few.

In some embodiments, the first and second ends 100/104 of the shroud 96 may comprise the same material, and in some cases, may comprise a substantially rigid material. As noted above, a substantially material may enable the shroud 96 to resist deformation when the smoke detector shield 90 is installed onto a smoke detector, especially when using the pole installed method depicted in FIG. 11A. Examples of substantially rigid materials are discussed above, but others may be used to form the shroud 96.

In other embodiments, the first and second ends 100/104 of the shroud 96 may comprise substantially different materials. In one such embodiment, the second end 104 of the shroud 96 may comprise a substantially rigid material, while first end 100 of the shroud 96 comprises a substantially pliant material. Examples of substantially pliant materials include, but are not limited to, biaxially-oriented polyethylene terephthalate (aka, Mylar™), polytetra-fluoroethylene (PTFE) (aka, Teflon™), and silicone.

As noted above, a substantially rigid material may resist deformation when the smoke detector shield 90 is installed onto a smoke detector, especially when using the pole installed method depicted in FIG. 11A. On the other hand, a substantially pliant material may conform to the smoke detector and/or to the surface upon which the smoke detector is installed to create a light tight and/or air tight seal around the smoke detector. For this reason, the first end 100 of the shroud 96 preferably comprises a substantially pliant material and the second end 104 of the shroud 96 preferably comprise a substantially rigid material, in at least some embodiments. In some cases, materials listed above as pliant may be rigid (and vice versa), depending on blend, composition, thickness, etc. In some cases, a substantially pliant material may be infused or coated on a substantially rigid base to render the combination substantially rigid. While examples of substantially rigid and substantially pliant materials are discussed above, others may be used to form the shroud 96.

Regardless of the rigidity of the material(s) used to form the shroud 96, the shroud preferably comprises one or more materials, which are configured to block the transmission of infrared light, and/or ultraviolet light, and/or higher intensity visible light. Examples of materials configured to block infrared light include, but are not limited to, a modified polyphenyene ether/olefin resin blend (e.g., a Noryl™ resin), poly(methyl methacrylate) (aka, Plexiglas™) having a thickness greater than about 0.118 inch, biaxially-oriented polyethylene terephthalate (aka, Mylar™), and various metals or metalized materials (e.g., gold, aluminum, etc.). Examples of materials configured to block ultraviolet light include, but are not limited to, poly(methyl methacrylate) (aka, Plexiglas™), polytetra-fluoroethylene (PTFE) (aka, Teflon™), biaxially-oriented polyethylene terephthalate (aka, Mylar™), polycarbonate, wood, silicone, and various metals or metalized materials. As noted above, providing the shroud 96 with a material that blocks transmission of such light may mitigate false tripping of smoke alarms by preventing a photoelectric receiver disposed within a shielded smoke detector from receiving such light from the ambient.

In some embodiments, seal 106 may be disposed along the peripheral edge of the opening in the second end 104 to further reduce false tripping of smoke alarms by conforming to an exterior surface of the received smoke detector and providing a light tight seal. In some cases, seal 106 may be a gasket. In other cases, seal 106 may be an elastic material, such as neoprene rubber or another material with even greater elasticity. In some cases, a size, shape and/or elasticity of seal 106 may enable the seal to conform to a variety of different smoke detectors having different shapes and/or sizes. In some cases, seal 106 may be coupled to an interior surface of the second end 104 by a retaining ring 107 and screws 105, as shown in the exemplary assembly diagram of FIG. 11C. In other cases, seal 106 may be coupled to an interior surface of the second end 104 by other means including, but not limited to, an adhesive. In some cases, seal 106 may extend radially from the interior surface of the second end 104 into the opening in the second end, thereby reducing the diameter of such opening. Regardless of the particular configuration of the seal, seal 106 may preferably comprise a material, which is configured to block the transmission of infrared light, and/or ultraviolet light, and/or higher intensity visible light.

As shown in FIGS. 11A-11C, some embodiments of smoke detector shield 90 may comprise two or more suspension members 108 that are coupled to and extend below the shroud, and a component 110 that is coupled to the suspension members 108, such that a gap exists between the shroud and the component. In one embodiment, screws 109 may be used to couple the suspension members 108 to the second end 104 of the shroud and to component 110, as shown in FIG. 11C. Alternative means for attachment may also be used.

As shown in FIGS. 11B-11C, a lower surface of component 110 may include a connector 112, which is configured for coupling to a pole, such as the pole 94 shown in FIG. 11A and discussed above. In one embodiment, pole connector 112 may be attached to the lower surface of component 110 via a screw 111 inserted through component 110, as shown in FIG. 11C. Alternative means for attaching pole connector 112 to component 110 may also be used. As described herein, the suspension members 108, component 110 and pole connector 112 may be included within smoke detector shield 90 for the purpose of positioning shroud 96 around a smoke detector.

Although two suspension members 108 are depicted in FIGS. 11B-11C, it is noted that substantially any number of suspension members may be coupled between shroud 96 and component 110 as needed to provide a stable surface for installing the smoke detector shield 90 using the pole installation method shown in FIG. 11A. If other installation methods are used, suspension members 108, component 110 and pole connector 112 may not be necessary, and therefore, may be omitted from some embodiments of the smoke detector shield 90. If suspension members 108, component 110 and pole connector 112 are omitted, the shroud 96 of smoke detector shield 90 may be coupled to the smoke detector and/or to the surface on which the smoke detector is mounted by substantially any means including, but not limited to, mechanical fasteners (e.g., springs, clips, clamps, screws, etc.), the elastic seal 106 arranged within the opening in the second end 104 of the shroud, and/or another elastic material arranged within the opening in the first end 100 of the shroud. Other means for coupling shroud 96 to the smoke detector and/or to the mounting surface may also be used.

If suspension members 108, component 110 and pole connector 112 are included within smoke detector shield 90, a height of the suspension members 108 may generally be chosen to ensure that a sufficient gap exists between an upper surface of the component 110 and a lower surface of the second end 104 of the shroud 96. In some embodiments, a height of the suspension members may range between about 1 inch and about 4 inches to accommodate smoke detectors typically used in residential, commercial and/or healthcare settings. It is noted, however, that such a height is merely exemplary and may be substantially smaller or larger to accommodate different sizes of smoke detectors. For some types of smoke detectors, such as smoke detector 200 shown in FIGS. 12 and 13, the gap maintained by suspension members 108 may enable a portion of the smoke detector received within the shroud 96 to protrude out through the opening in the second end 104 of the shroud, as shown in FIG. 11B. However, this may not always be the case. For other types of smoke detectors, the gap maintained by the suspension members may simply provide sufficient air flow in the vicinity of the exposed smoke inlets.

In FIGS. 11A-11C, suspension members 108 are illustrated as being coupled between an upper surface of component 110 and a lower surface of the second end 104 of the shroud, but are not strictly limited to such couplings. In one alternative embodiment, suspension members 108 may be coupled between an upper surface of component 110 and the one or more sidewall(s) 102 of the shroud 96. In such an embodiment, suspension members 108 may be bent or angled to facilitate connection of the suspension members to sidewall(s) 102, but are not required to do so.

In FIGS. 11A-11C, component 110 is illustrated as a substantially circular plate having a diameter, which is slightly larger than a diameter of the shroud 96. It is noted, however, that component 110 is not strictly limited to any particular shape or size, and may comprise any other shape and/or size that provides a stable surface for both coupling suspension members 108 to the shroud 96 and for coupling a pole to connector 112. In some embodiments, component 110 may comprise the same material(s) used to form the shroud, and in some cases, may comprise a material configured to block the transmission of infrared light, and/or ultraviolet light, and/or higher intensity visible light. Examples of materials configured to block such light are discussed above. However, since the primary intent of the component 110 is to provide a stable surface, component 110 may comprise other materials that may not be configured to block the transmission of light.

As shown in FIGS. 11B-11C, connector 112 may be configured for coupling to a pole, such as the pole 94 shown in FIG. 11A as discussed above. In some embodiments, a quick release device may be incorporated within, or may be coupled to, connector 112 for attaching and detaching the pole 94 from the smoke detector shield 90. In some cases, a quick release device located at or near the connector 112 may be used to detach the pole 94 from the smoke detector shield 90 after it has been installed and retained on a smoke detector. In other cases, a quick release device located at or near the connector 112 may be used to detach the pole 94 from the smoke detector shield 90 for transport and/or storage purposes. As noted above, examples of quick release devices include, but are not limited to, a quick-release spring, a quick-release clamp and male/female threaded connectors.

In addition to embodiments of smoke detector shields, a method is provided herein for shielding a smoke detector. According to one embodiment, such a method may include shielding at least a portion of a smoke detector, which is operationally arranged within a room, and activating a light emission device within the room while shielding the at least portion of the smoke detector. As used herein, "operationally arranged" means the smoke detector is arranged within the room and connected to a power source (such as a battery or mains power) for detecting the presence of smoke. When activated, the light emission device may be configured to generate infrared light, ultraviolet light and/or visible light, and/or generate infrared light, ultraviolet light, and/or visible light to cause a significant differential in any one or more of those ranges of light in a room.

The step of shielding the smoke detector may include installing any one of the smoke detector shields described herein around a smoke detector. In some embodiments, the smoke detector may be a photoelectric smoke detector, more preferably, a spot type photoelectric receiver, and even more preferably, a spot type photoelectric receiver having a photoelectric receiver arranged outside of the light-blocking material surrounding the interior chamber (e.g., interior chamber 220 of FIG. 13). However, the smoke detector is not limited to such, and may comprise other types of smoke detectors in other embodiments.

In some embodiments, the step of shielding a smoke detector may include positioning a smoke detector shield around at least portion of the smoke detector. As noted above, any one of the smoke detector shields described herein may be positioned around a smoke detector in the shielding step. In some embodiments, a pole coupled to the smoke detector shield may be used to position the smoke detector shield around the at least a portion of the smoke detector. In some embodiments, the pole may be detached from the smoke detector shield subsequent to positioning the smoke detector shield around the at least a portion of the smoke detector, and prior to activating the light emission device. In other embodiments, the pole may remain attached to the smoke detector shield during activation of the light emission device. It is noted, however, that a pole installation method is merely exemplary and not strictly necessary.

If a pole is used to install the smoke detector shield onto a smoke detector, the pole may be a fixed length pole or a telescoping pole having a first end configured for attachment to the smoke detector shield, and a second end opposing the first end. If the pole is a telescoping pole, the step of positioning the smoke detector shield around the at least a portion of the smoke detector may include positioning the second end of the telescoping pole, or a support base coupled to the second end of the telescoping pole, on a substantially horizontal surface located near the smoke detector, and extending the telescoping pole to a height, which positions a shroud of the smoke detector shield around the at least a portion of the smoke detector and presses one end of the shroud tightly against a surface upon which the smoke detector is mounted.

In some cases, the step of activating the light emission device may include remotely activating the light emission device from outside of the room. In some cases, the method may further include evacuating the room subsequent to positioning the smoke detector shield around the smoke detector and prior to activating the light emission device. In some cases, the method may further include deactivating the light emission device and subsequently unshielding the smoke detector. In one example, the method may unshield the smoke detector after operation of the light emission device has ceased and, in some embodiments, within 30 minutes of the light emission device ceasing operation. In other cases, the smoke detector may not be unshielded after the light emission device has been deactivated.

Examples of light emission devices that may be activated within the room while the smoke detector is shielded may include, but are not limited to, germicidal light disinfection systems, operating room light fixtures, phototherapy systems, UV light curing systems and remote controls for electronic devices. These types of light emission devices may generate ultraviolet light, infrared light and/or visible light at wavelengths and/or intensities that may penetrate the housing of an unshielded smoke detector arranged within the room. If the unshielded smoke detector is a spot type photoelectric smoke detector, a photoelectric receiver disposed within the smoke detector housing may receive such light and produce photocurrents sufficient to generate a false alarm. Shielding at least a portion of a smoke detector with one of the smoke detector shields described herein may prevent the photoelectric receiver of a shielded smoke detector from receiving ultraviolet light, infrared light and/or visible light from such light emission devices, thereby mitigating the occurrence of false alarms.

It is noted that photoelectric smoke detectors are not typically triggered by sunlight, or by ambient light generated within a room for lighting purposes (e.g., overhead lights or lamps) or for electronic/communication control purposes (e.g., remote control devices). As such, it is generally not necessary to shield a smoke detector from all light emission devices and light sources that may be found within a room. In order to exclude light emission devices commonly found within a room, such as overhead lights, lamps and remote control devices (such as a TV remote), the method described herein may only be used to shield a smoke detector while activating a light emission device, which is arranged within the same room as the smoke detector, when the light emission device is configured for generating infrared light at a radiant intensity greater than approximately 1 Watts/steradian (W/sr), and/or ultraviolet light at a radiant intensity greater than approximately 1 W/sr, and/or visible light at a luminous flux greater than approximately 3000 lumens.

Light emission devices commonly found within a room, such as overhead lights, lamps and remote control devices, are typically not capable of generating light at such radiant intensity or lumen values, and therefore, are not considered "light emission devices," as used herein. As one example, a 150 W incandescent or halogen light bulb, a 40 W CFL light bulb and a 24 W LED light bulb may generate approximately 2600 lumens of visible light, while lower wattage counterparts produce significantly less lumens. As another example, a typical infrared (IR) emitter (e.g., an IR LED) included within a remote control device may generate approximately 10 milliWatts/steradian (mW/sr) to approximately 300 mW/sr. These light emission devices, and other light emission devices typically found within a room typically do not produce infrared light, ultraviolet light and/or visible light at an intensity and/or wavelength sufficient to penetrate the housing of an unshielded smoke detector and/or generate sufficient photocurrent within a photoelectric receiver disposed therein to result in a false alarm.

On the other hand, other light emission devices including, but not limited to, germicidal disinfection systems, operating room light fixtures, phototherapy systems and UV light curing systems may generate infrared light, ultraviolet light and/or visible light at an intensity and/or wavelength sufficient to penetrate the housing of an unshielded smoke detector to produce false alarms. These light emission devices may be configured for generating infrared light at a radiant intensity much greater than 1 W/sr, and/or ultraviolet light at a radiant intensity much greater than approximately 1 W/sr, and/or visible light at a luminous flux much greater than approximately 3000 lumens. Although not limited to such, the smoke detector shields described herein may be particularly useful for shielding smoke detectors from light generated from such light emission devices.

In one particular example, the smoke detector shields described herein may be used for shielding smoke detectors from light generated by germicidal light disinfection systems. As described in more detail below, many different light sources may be used for disinfection purposes. In one example, a light source used for germicidal disinfection may be configured for generating infrared light at a radiant intensity of greater than about 50 W/sr or more, and/or ultraviolet light at a radiant intensity greater than about 10 W/sr or more, and/or visible light at a luminous flux of about 30,000 lumens or more. Other light sources used for germicidal disinfection may generate substantially more or less infrared light, ultraviolet light and/or visible light.

The term "germicidal light" refers to light which is capable of deactivating or killing microorganisms, particularly disease carrying and/or disease producing microorganisms (a.k.a., germs). The term "germicide" as used herein refers to an agent for deactivating or killing microorganisms, particularly disease carrying and/or disease producing microorganisms (a.k.a., germs). The term "kill," as used herein, means to cause the death of an organism. The term "deactivate," as used herein, means to render an organism unable to reproduce without killing. As such, a germicide which is configured to deactivate a microorganism refers to an agent which renders a microorganism unable to reproduce but leaves the organism alive. Ranges of light which are known to be germicidal include ultraviolet light between approximately 200 nm and approximately 320 nm, particularly 205 nm, 230 nm and between 260 nm and 265 nm, and visible violet-blue light (also known as high-intensity narrow-spectrum (HINS) light) between approximately 400 nm and approximately 470 nm, particularly 405 nm. As such, germicidal light considered for the germicidal light disinfection systems described herein may include ultraviolet light and/or high-intensity narrow-spectrum (HINS) light. As used herein, UVA light is ultraviolet electromagnetic radiation subtype A with a wavelength between 320 nm to 400 nm, UVB light is ultraviolet electromagnetic radiation subtype B with a wavelength between 280 nm to 320 nm, and UVC light is ultraviolet electromagnetic radiation subtype C (UVC) with a wavelength between 200 nm to 280 nm.

In some cases, the germicidal light sources considered for the light emission devices described herein may be polychromatic in that they generate light of more than one wavelength. In some embodiments, a germicidal light source may generate ranges of light which are not germicidal such as but not limited to infrared light or visible light greater than approximately 500 nm, but such capability will not deter from the reference of the light sources being germicidal. Furthermore, a light source or lamp may, in some cases, be characterized in the type of light it generates, but such characterization need not limit the light source or lamp to generating only that type of light. For example, an ultraviolet lamp is one which generates ultraviolet light but it may produce light of other wavelengths. The terms "germicidal light source" and "germicidal lamp" are used interchangeably herein and refer to a collection of one or more components used to generate and disperse germicidal light.

Examples of germicidal light sources which may be configured to generate ultraviolet light and/or high-intensity narrow-spectrum (HINS) light include discharge lamps, light emitting diode (LED) solid state devices, and excimer lasers. HINS lamps are generally constructed of LEDs. A discharge lamp as used herein refers to a lamp that generates light by means of an internal electrical discharge between electrodes in a gas. The term encompasses gas-discharge lamps, which generate light by sending an electrical discharge through an ionized gas (i.e., a plasma). The term also encompasses surface-discharge lamps, which generate light by sending an electrical discharge along a surface of a dielectric substrate in the presence of a gas, producing a plasma along the substrate's surface. As such, the germicidal lamps which may be considered for the germicidal light disinfection systems described herein include gas-discharge lamps as well as surface-discharge lamps.

Discharge lamps may be characterized by the type of gas/es employed and the pressure at which they are operated. The discharge lamps which may be considered for the germicidal light disinfection systems described herein include those of low pressure, medium pressure and high intensity. In addition, the gas/es employed may include helium, neon, argon, krypton, xenon, nitrogen, oxygen, hydrogen, water vapor, carbon dioxide, mercury vapor, sodium vapor and any combination thereof. In addition, the germicidal light sources considered for the germicidal light disinfection systems described herein may include those which generate continuous light and/or those which generate light in recurrent short durations, the latter of which are referred to herein as pulsed light sources. Discharge lamps which produce recurrent pulses of light are often referred to as flashtubes or flashlamps.

A commonly used gas-discharge lamp used to produce continuous light is a mercury-vapor lamp, which may be considered for some of the methods and systems described herein. It emits a strong peak of light at 253.7 nm, which is considered particularly applicable for germicidal disinfection and, thus, is commonly referenced for ultraviolet germicidal irradiation (UVGI). A commonly used flashlamp which may be considered for the germicidal light disinfection systems described herein is a xenon flashtube. In contrast to a mercury-vapor lamp, a xenon flashtube generates a broad spectrum of light from ultraviolet to infrared and, thus, provides ultraviolet light in the entire spectrum known to the germicidal (i.e., between approximately 200 nm and approximately 320 nm). In addition, a xenon flashtube can provide relatively sufficient intensity in the spectrum which is known to be optimally germicidal (i.e., between approximately 260 nm and approximately 265 nm). Moreover, a xenon flashtube generates an extreme amount of heat, which can further contribute to the deactivation and killing of microorganisms.

Although they are not readily available on the commercial market to date, a surface-discharge lamp may be considered for some of the germicidal light disinfection systems described herein as noted above. Similar to a xenon flashtube, a surface-discharge lamp produces ultraviolet light in the entire spectrum known to the germicidal (i.e., between approximately 200 nm and approximately 320 nm). In contrast, however, surface-discharge lamps operate at higher energy levels per pulse and, thus, greater UV efficiency, as well as offer longer lamp life as compared to xenon flashtubes. It is noted that the aforementioned descriptions and comparisons of a mercury-vapor lamp, a xenon flashlamp, and a surface discharge lamp in no way restrict the germicidal light disinfection systems described herein to include such lamps. Rather, the aforementioned descriptions and comparisons are merely provided to offer factors which one skilled in the art may contemplate when selecting a germicidal light source for the germicidal light disinfection systems described herein.

A disinfection apparatus may be configured to distribute germicidal light into an ambient of a room in a spacious manner. The disinfection apparatus may be of any shape, size, or configuration in which to achieve such an objective. In some cases, the disinfection apparatus may be configured to disperse germicidal light to a continuous ring region around the apparatus. In particular, an apparatus may in some cases be void of an opaque component 360° around an elongated portion of the germicidal light source such that light emitted from the germicidal light source encircles the apparatus. In some cases, a disinfection apparatus may include components in addition to a light source to effect the generation or dispersal of the germicidal light from the light source, such as reflectors, particularly which exhibit a relatively high degree of reflectivity (e.g., greater than approximately 85%). Regardless of the number of germicidal light sources comprising a disinfection apparatus or whether it is equipped with additional components to aid in the dispersal of the germicidal light, the disinfection apparatuses described herein may include other germicidal means, such as but not limited to chemical sprays, fogs or vapors.

In some cases, it may be advantageous for a room/area germicidal light disinfection device configured to direct germicidal light to a region approximately 2 feet and approximately 4 feet from a floor of a room in which the apparatus is arranged. In particular, the region between approximately 2 feet and approximately 4 feet from a floor of a room is considered a "high touch" region of a room since objects of frequent use are generally placed in such a region. Thus, a disinfection apparatus configured to direct light to such a region may be suited for room disinfection processes. Examples of disinfection apparatuses configured to direct germicidal light to a region approximately 2 feet and approximately 4 feet from a floor of a room in which the apparatus is arranged are disclosed in U.S. application Ser. No. 13/706,926 filed Dec. 6, 2012 and Ser. No. 13/708,208 filed Dec. 7, 2012 as well as International Application No. PCT/US2014/059698 filed Oct. 8, 2014, all of which are incorporated herein by reference as if set forth fully herein. It is noted that a feature which often is in included in apparatuses configured for room disinfection and having UV light sources is an occupancy sensor, particularly such that the generation of UV light may be inhibited and/or terminated upon making a detection which is indicative of occupancy within the area/room in which the apparatus is arranged.

It will be appreciated to those skilled in the art having the benefit of this disclosure that this invention is believed to provide smoke detector shields configured to block or minimize the transmission of light therethrough and methods for use. As noted above, the smoke detector shields described herein are particularly useful in mitigating the false tripping of photoelectric receivers within spot type photoelectric smoke detectors by shielding the photoelectric receiver from ambient light in a room. However, the smoke detector shields and methods described herein are not strictly limited to shielding spot type photoelectric smoke detectors, or to shielding the photoelectric receivers of such smoke detectors.

In some cases, some embodiments of the smoke detector shields described herein may be used to mitigate false tripping of smoke detectors that are configured to detect heat or changes in ionization. For example, some embodiments of the smoke detector shields described herein may be configured to encapsulate an entirety of the smoke detector when the smoke detector is mounted on a surface, thereby reducing and/or preventing heat and/or smoke particles from entering the smoke detector. Examples of smoke detector shields configured to encapsulate an entirety of a smoke detector mounted onto a surface are shown in FIGS. 7-10. As such, the smoke detector shields and methods described herein may be used to mitigate false tripping of smoke detectors by preventing a photoelectric receiver of a photoelectric smoke detector from detecting ambient light in a room, and/or by preventing heat and/or smoke particles from entering any type of smoke detector.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. The term "approximately" as used herein refers to variations of up to +/−5% of the stated number.

What is claimed is:

1. A device for shielding a smoke detector, wherein the device comprises:
    a shroud configured for surrounding at least a portion of a smoke detector;
    a pole having a first end coupled to the shroud, and a second end opposing the first end, wherein the pole comprises a length, or is configured to extend to a length, of at least approximately 3.0 feet; and
    a support base coupled near the second end of the pole for supporting the device on a horizontal surface.

2. The device as recited in claim 1, wherein the pole comprises a length, or is configured to extend to a length, of at least approximately 5.0 feet.

3. The device as recited in claim 1, wherein the pole is a telescoping pole.

4. The device as recited in claim 1, further comprising one or more quick release devices for detaching the pole from the shroud and/or for disassembling the pole into two or more sections.

5. The device as recited in claim 1, wherein the support base is a collapsible support base.

6. The device as recited in claim 5, wherein the support base is a collapsible tripod.

7. The device as recited in claim 1, wherein the support base, shroud, and pole are configurable such that the device is able to attain a height of at least approximately 7 feet.

8. The device as recited in claim 1, wherein the shroud is configured to encapsulate an entirety of the smoke detector when the smoke detector is mounted to a surface.

9. The device as recited in claim 1, wherein the shroud is configured to surround at least a portion of the smoke detector while leaving one or more smoke inlets of the smoke detector uncovered by the shroud.

10. The device as recited in claim 1, wherein the shroud comprises an upper surface configured for attachment to a surface upon which the smoke detector is mounted.

11. The device as recited in claim 1, wherein the shroud comprises an upper surface configured for attachment to the smoke detector.

12. A method, comprising:
 positioning a base of a smoke detector shield on a horizontal surface under a ceiling mounted smoke detector, wherein the smoke detector shield comprises:
  a telescoping pole, wherein a first end of the telescoping pole is the base of the smoke detector shield or is coupled to the base of the smoke detector shield; and
  a smoke detector shroud coupled to a second end of the telescoping pole opposing the first end; and
 extending the telescoping pole such that the smoke detector shroud surrounds at least a portion of the smoke detector and the smoke detector shroud is secured by tension of the telescoping pole against a ceiling which the smoke detector is mounted.

13. The method of claim 12, further comprising activating a light emission device while the smoke detector shroud is positioned around the smoke detector and secured against the ceiling, wherein the light emission device is configured to generate infrared light at a radiant intensity greater than approximately 1 W/sr, and/or ultraviolet light at a radiant intensity greater than approximately 1 W/sr, and/or visible light at a luminous flux greater than approximately 3000 lumens.

14. The method of claim 13, wherein the light emission device is a germicidal light disinfection apparatus.

15. The method of claim 13, further comprising deactivating the light emission device and subsequently retracting the telescoping pole to unshield the smoke detector.

16. The method of claim 13, wherein the smoke detector is operationally arranged in a room, and wherein the step of activating the light emission device comprises remotely activating the light emission device from outside of the room.

17. The method of claim 13, wherein the smoke detector is operationally arranged in a room, and wherein the method further comprises evacuating the room subsequent to positioning the smoke detector shroud around the smoke detector and prior to activating the light emission device.

* * * * *